(12) United States Patent
Piccolo, III et al.

(10) Patent No.: US 11,223,491 B2
(45) Date of Patent: Jan. 11, 2022

(54) FIRE ALARM SYSTEM POWERING A WIRELESS BUILDING NETWORK

(71) Applicant: Johnson Controls Technology Company, Auburn Hills, MI (US)

(72) Inventors: Joseph Piccolo, III, Fitzwilliam, NH (US); Craig E. Trivelpiece, Mission Viejo, CA (US); Timothy C. Gamroth, Dousman, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 106 days.

(21) Appl. No.: 16/530,976

(22) Filed: Aug. 2, 2019

(65) Prior Publication Data

US 2020/0044876 A1   Feb. 6, 2020

Related U.S. Application Data

(60) Provisional application No. 62/713,967, filed on Aug. 2, 2018.

(51) Int. Cl.
*H04L 12/10* (2006.01)
*H04W 4/33* (2018.01)

(52) U.S. Cl.
CPC .............. *H04L 12/10* (2013.01); *H04W 4/33* (2018.02)

(58) Field of Classification Search
CPC ............. H04L 12/10; H04L 2012/2841; H04L 12/2803; H04W 4/33
See application file for complete search history.

(56) References Cited

U.S. PATENT DOCUMENTS

| | | | |
|---|---|---|---|
| 2003/0058109 A1* | 3/2003 | Costa | G08B 17/00 340/573.1 |
| 2009/0163151 A1 | 6/2009 | Menden et al. | |
| 2014/0340215 A1* | 11/2014 | Piccolo, III | G08B 29/126 340/514 |
| 2016/0330285 A1 | 11/2016 | Brophy et al. | |
| 2017/0343231 A1 | 11/2017 | Rumler et al. | |
| 2018/0299844 A1 | 10/2018 | Ray et al. | |
| 2018/0359109 A1* | 12/2018 | O'Hora | H04L 12/2818 |
| 2021/0046988 A1* | 2/2021 | Bean | G05B 19/4185 |

OTHER PUBLICATIONS

Simplex, TrueAlert Addressable Notification Appliances, S4906CE-002-2, Feb. 2015 (Year: 2015).*
U.S. Appl. No. 15/999,263, filed Aug. 17, 2018, Johnson Controls Technology Company.
U.S. Appl. No. 16/246,080, filed Jan. 11, 2019, Johnson Controls Technology Company.
U.S. Appl. No. 16/499,148, filed Jun. 21, 2019, Johnson Controls Technology Company.

* cited by examiner

*Primary Examiner* — Walter J Divito
(74) *Attorney, Agent, or Firm* — Foley & Lardner LLP

(57) ABSTRACT

A wireless infrastructure component for integration with a building fire system includes a first mounting interface and a wireless communications interface. The first mounting interface is configured to physically couple to a mounting surface and includes a first power connector that is configured to receive power from the building fire system. The wireless communications interface is electrically coupled to the first power connector and is configured to use the power from the building fire system in order to conduct wireless communications with one or more wireless devices.

19 Claims, 18 Drawing Sheets

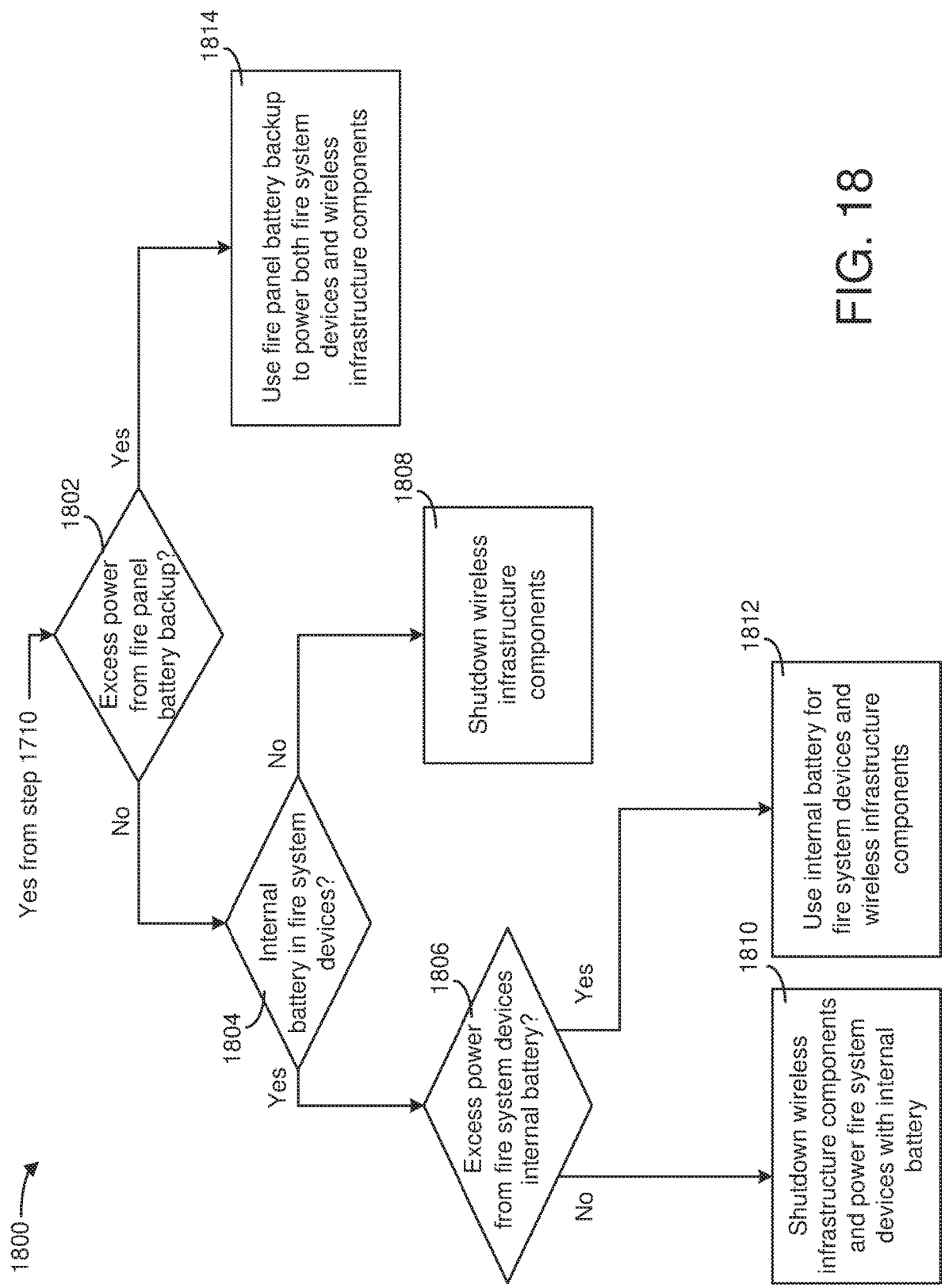

FIRE ALARM SYSTEM POWERING A WIRELESS BUILDING NETWORK

CROSS-REFERENCE TO RELATED PATENT APPLICATION

This application claims the benefit of and priority to U.S. Provisional Patent Application No. 62/713,967 filed Aug. 2, 2018, the entire disclosure of which is incorporated by reference herein.

BACKGROUND

The present disclosure relates generally to building control systems and more particularly to a Fire Detection System (FDS) for a building within a building management system. A building management system (BMS) is, in general, a system of devices configured to control, monitor, and manage equipment in or around a building or building area. A FDS is, in general, a system of devices configured to control, monitor, and manage equipment in or around a building or building area to detect and suppress fires. A FDS can include, for example, a fire alerting system, a fire suppression system, and any other system that is capable of managing building fire safety functions or devices, or any combination thereof. A FDS can include a fire alarm control panel, visual and audio fire notification devices, fire detection devices, fire suppression devices, and/or addressable call points (e.g. addressable manual pull stations).

Some BMSs have wireless communications infrastructure devices (e.g., routers, access points, gateways, switches, IT devices, etc.) distributed throughout the building and connected to a wired interface. However, the communications infrastructure devices are separate from the FDS.

SUMMARY

One implementation of the present disclosure is a wireless infrastructure component for integration with a building fire system. The wireless infrastructure component includes a first mounting interface that is configured to physically couple to a mounting surface and includes a first power connector that is configured to receive power from the building fire system. The wireless infrastructure component includes a wireless communications interface that is electrically coupled to the first power connector and is configured to use the power from the building fire system to conduct wireless communications with one or more wireless devices.

In some embodiments, the wireless infrastructure component includes a second mounting interface that is configured to physically couple to a fire system component and includes a second power connector configured to provide power to the fire system component. The second power connector is electrically coupled to the first power connector such that the power from the building fire system passes through the wireless infrastructure component from the first power connector to the second power connector.

In some embodiments, the fire system component is a fire notification device or a fire detection device of the building fire system.

In some embodiments, the fire system component comprises a third mounting interface configured to physically couple to the mounting surface and the first mounting interface of the wireless infrastructure component is configured to emulate the third mounting interface to enable the wireless infrastructure component to be physically coupled to the mounting surface.

In some embodiments, the mounting surface comprises a fourth mounting interface configured to physically couple to the third mounting interface of the fire system component and the second mounting interface of the wireless infrastructure component is configured to emulate the fourth mounting interface to enable the wireless infrastructure component to be physically coupled to the third mounting interface of the fire system component.

In some embodiments, the mounting surface is a second mounting interface of a fire system component. The second mounting interface is configured to physically couple to the first mounting interface and includes a second power connector configured to provide the power from the building fire system to the wireless infrastructure component such that the power from the building fire system passes through the fire system component before being received at the wireless infrastructure component.

The wireless infrastructure component includes a control board in some embodiments. The control board is configured to electrically couple the wireless communications interface to the first power connector, determine a state of the building fire system, and selectively provide the power from the building fire system to the wireless communications interface based on the state of the building fire system.

In some embodiments, the state of the building fire system is a backup battery state and the control board is configured to determine that the power from the building fire system is being received and that the power is not from a backup battery of the building fire system and operate the wireless infrastructure component and the fire system component on the power from the building fire system in response to determining that the power from the building fire system is not from the backup battery.

In some embodiments, the wireless infrastructure component comprises at least one of a wireless mesh node, a wireless repeater, a wireless occupancy sensor, or a wireless HVAC sensor that receives and sends signals via wireless network.

In some embodiments, the power from the building fire system is a wired input from a fire panel Initiating Device Notification Appliance Circuit (IDNAC) bus.

Another implementation of the present disclosure is a building fire system. The building fire system includes a fire system component and a wireless infrastructure component. The fire system component is configured to operate on power from the building fire system. The wireless infrastructure component is configured to physically couple to the fire system component so that the wireless infrastructure component is powered by the power from the building fire system. The wireless infrastructure component is further configured to conduct wireless communications with one or more wireless devices using the power from the building fire system.

In some embodiments, the wireless infrastructure component is configured to detect a loss of the power from the building fire system, determine whether an amount of energy in a backup battery is sufficient to power both the fire system component and the wireless infrastructure component, and shut down the wireless infrastructure component in response to observing the energy in the backup battery of the fire system component fails to meet the limit.

In some embodiments, the wireless infrastructure component includes a first mounting interface that is configured to physically couple to a mounting surface and includes a first power connector that is configured to receive power from the building fire system. The wireless infrastructure component includes a second mounting interface that is configured to physically couple to a fire system component and includes a second power connector configured to provide power to the fire system component. The second power connector is electrically coupled to the first power connector such that the power from the building fire system passes through the wireless infrastructure component from the first power connector to the second power connector.

In some embodiments, the fire system component of the building fire system comprises a third mounting interface configured to physically couple to the mounting surface and the first mounting interface of the wireless infrastructure component is configured to emulate the third mounting interface to enable the wireless infrastructure component to be physically coupled to the mounting surface.

In some embodiments, the fire system component comprises a rear face configured to physically couple to a mounting surface and receive the power from the building fire system and a front face configured to physically couple to the wireless infrastructure component and provide the power from the building fire system to the wireless infrastructure component.

In some embodiments, the mounting surface of the building fire system is a mounting plate and the power from the building fire system is received via the mounting plate.

Another implementation of the present disclosure is a method for powering wireless infrastructure components using power from a building fire system. The method includes operating a fire system component on the power from the building fire system. The method further includes physically coupling a wireless infrastructure component to the fire system component so that the wireless infrastructure component is powered by the power from the building fire system. The method further includes conducting, by the wireless infrastructure component, wireless communications with one or more wireless devices using the power from the building fire system.

In some embodiments, the method comprises detecting a loss of the power from the building fire system, determining whether an amount of energy in a backup battery is sufficient to power both the fire system component and the wireless infrastructure component, and shutting down the wireless infrastructure component in response to determining that the amount of energy in the backup battery is insufficient to power both the fire system component and the wireless infrastructure component.

In some embodiments, the wireless infrastructure component comprises at least one of a wireless mesh node, a wireless repeater, a wireless occupancy sensor, or a wireless HVAC sensor that receive and send signals via wireless network.

In some embodiments, the fire system component is a fire suppression device, a fire notification device in a fire notification loop, or a fire detection device in a fire detection loop of the fire system.

In some embodiments, a wired connection of the wireless infrastructure component to the fire notification loop or the fire detection loop is an auxiliary connection.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 18 is a flowchart of a process for the decision making of how to further power the fire system devices and wireless infrastructure components, which can continue from the process of FIG. 17, according to some embodiments.

DETAILED DESCRIPTION

Overview

Referring generally to the FIGURES, a building management system (BMS) with a fire system is shown, according to various embodiments. The fire system can be configured to detect when a fire occurs and can use the power of the fire system to power a wireless building network. The fire system can include various fire devices within the building. For example, the fire system can include a fire control panel that is connected with a detection devices loop and notification devices loop, while also communicating with the other fire control panels in the fire system. The notification devices loop may contain devices such as addressable smoke detectors, manual pull stations, and fire alarm strobe lights. The fire system devices within the fire system can use disposable or rechargeable batteries for backup power to continue operating when the main electrical power supply for the building fails. By operating the wireless communications infrastructure on the power of the fire system, the fire system can power the building's wireless network on the backup power of the fire system when a power outage (i.e., power failure) occurs.

This approach to powering a wireless building network provides various advantages associated with the BMS and its subsystems. For example, installation of wireless communication infrastructure is costly, even more so once the building construction is complete. Thus, using retrofit wireless infrastructure components that are installed in the same enclosure as the fire system devices installed in a building to power the wireless network of the building can greatly reduce those expenses. In addition, this approach to powering the wireless building network provides a potential way to continue powering wireless infrastructure components on the batteries of the fire system devices or backup power of a fire alarm control panel when the building suffers a power failure. Therefore, any wireless communications or transactions that need to be completed can also continue, despite a loss in the main power for a building. Furthermore, it is mandated by law that a building have a required amount of detection and notification fire system devices throughout a building. Thus, the powering of the wireless building network as described in the present disclosure can improve performance and coverage of wireless building networks, as the standard density of fire system devices in buildings is high. By extending wireless capabilities, other multiple building subsystems, such as HVAC and lighting, can also be supported by the powering of the wireless infrastructure components. These and other features of the BMS and fire system are described in greater detail below.

Building Management System and Fire System

Figure 1:
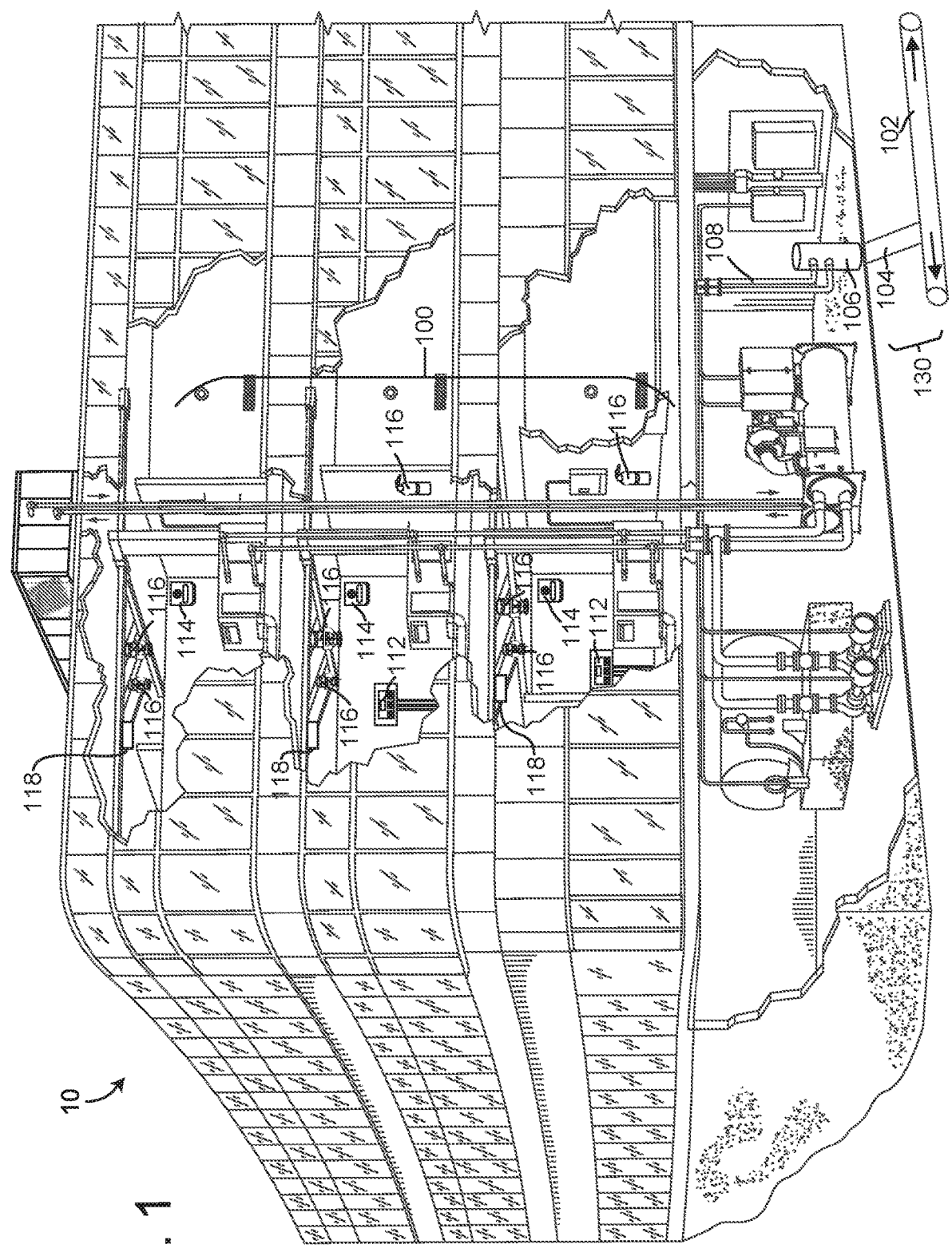
FIG. 1 is a drawing of a building equipped with a building management system (BMS) and a fire system, according to some embodiments.
Figure 2:
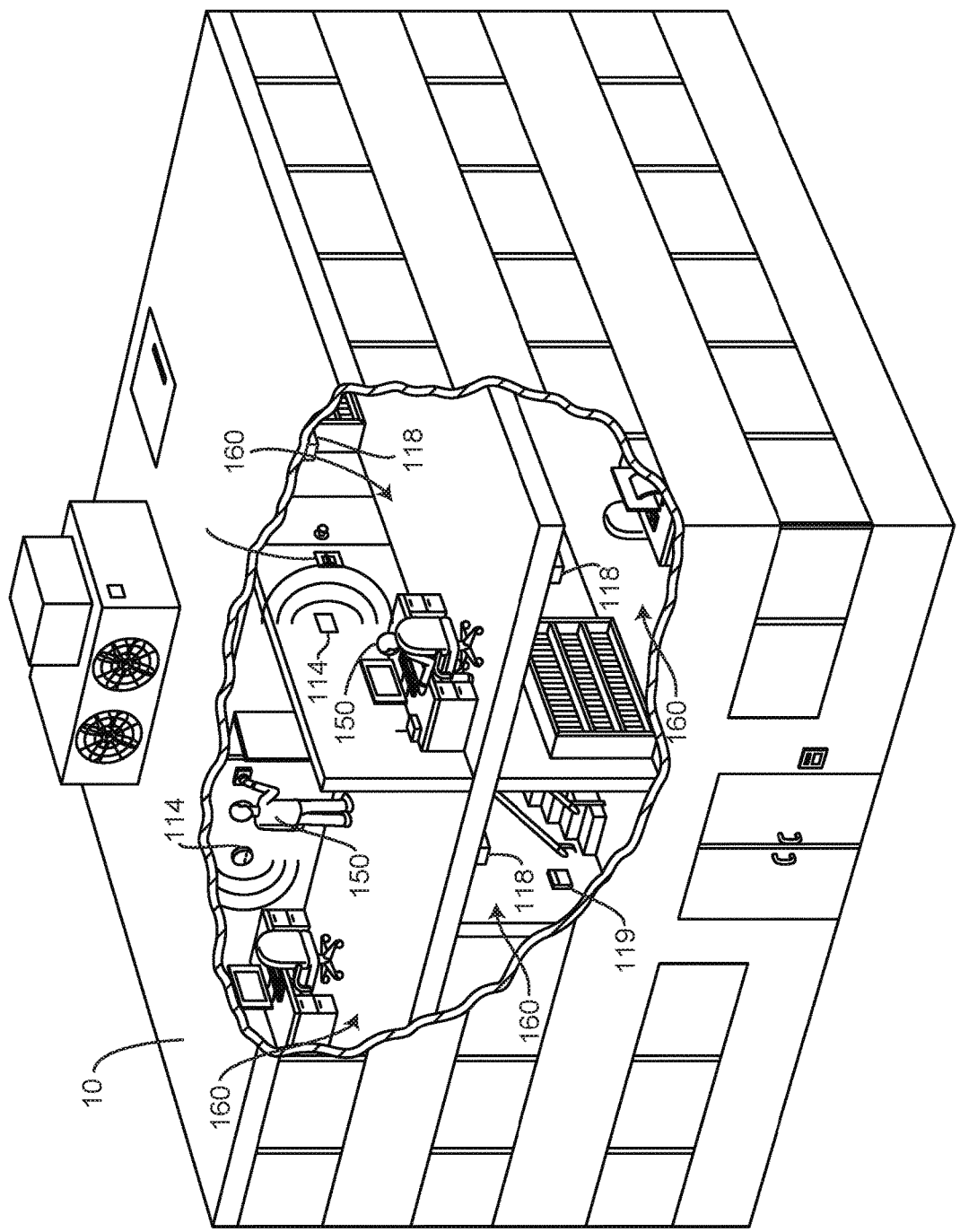
FIG. 2 is a perspective view of the building of FIG. 1, including rooms, occupants, fire notification devices, fire suppression devices, and fire detection devices of the fire system, according to some embodiments.

Referring now to FIGS. 1-4, a building management system (BMS) and fire suppression system are shown, according to some embodiments. Referring particularly to FIG. 1, a perspective view of a building 10 is shown. Building 10 is served by a building management system (BMS), according to some embodiments. A BMS is, in general, a system of devices configured to control, monitor, and manage equipment in or around a building or building area, according to some embodiments. A BMS can include, for example, a fire suppression system, a security system, a lighting system, a fire detection system, any other system that is capable of managing building functions or devices, or any combination thereof.

The BMS that serves building 10 includes a fire system 100 (e.g., a fire detection and/or fire suppression system), according to some embodiments. Fire system 100 can include fire safety devices (e.g., notification devices such as fire detectors and pull stations, sprinklers, fire alarm control panels, fire extinguishers, water systems etc.) configured to provide fire detection, fire suppression, fire notification to building occupants 150, or other fire suppression-related services for building 10. Fire system 100 includes water system 130, according to some embodiments. Water system 130 provides water from a city line 102 through a building line 104 to building 10 to suppress fires within one or more rooms/spaces of building 10, according to some embodiments. In some embodiments, a main water line 106 is the dominant piping system that distributes water throughout one or more of the building floors in building 10. The water is distributed to the one or more building floors of building 10 via a piping system 108, according to some embodiments.

Referring still to FIGS. 1-4, fire system 100 can also include fire detection devices 118, fire notification devices 114, and fire suppression devices 116 positioned in various rooms/spaces 160 of building 10. Fire suppression devices 116 may include sprinklers, fire extinguishers, etc., or any other device configured to suppress a fire. Fire suppression devices 116 may be positioned in various rooms 160 of building 10. Fire suppression devices 116 may be connected to piping system 108 and serve as one of the corrective actions taken by fire system 100 to suppress fires. In some embodiments, fire suppression devices 116 can engage in suppressive action using dry agents (nitrogen, foam, non-fluorinated foam, air, etc.) instead of water. One or more of the fire suppression devices may be a portable device capable of discharging a fire suppressing agent (e.g., water, foam, gas, etc.) onto a fire. Building 10 may include fire extinguishers (e.g., portable fire suppression devices) on several floors in multiple rooms 160. Fire system 100 can also include one or more pull stations 119 configured to receive a manual input from an occupant 150 of building 10 to indicate the presence of a fire. Pull stations 119 may include a lever, a button, etc., configured to receive a user input indicating that a fire has occurred in building 10. In some embodiments, pull stations 119 are configured to provide a signal to fire alarm control panel 112 regarding a status of the lever, button, etc. When an occupant 150 pulls the lever or pushes the button (or more generally inputs to any of pull stations 119 that there is an emergency situation in building 10), pull stations 119 provide fire alarm control panel 112 with an indication that an occupant 150 of building 10 has actuated one of the pull stations 119. In some embodiments, the indication includes an identification of the particular pull station 119 that has been actuated and a location of the particular pull station 119 (e.g., what floor the fire is at, what room the fire is in, etc.).

Fire notification devices 114 can be any devices capable of relaying audible, visible, or other stimuli to alert building occupants of a fire or other emergency condition. In some embodiments, fire notification devices 114 are powered by Initiating Device Notification Alarm Circuit (IDNAC) power from fire alarm control panel 112. In some embodiments, fire notification devices 114 may be powered by a DC power source (e.g. a battery). In some embodiments, fire notification devices 114 are powered by an external AC power source. Fire notification devices 114 can include a light notification device (e.g., a visual alert device) and a sound notification device (e.g., an aural alert device). The light notification device can be implemented as any component in fire notification devices 114 that alerts occupants 150 of an emergency by emitting visible signals. In some embodiments, fire notification devices 114 include a strobe light configured to emit strobe flashes (e.g., at least 60 flashes per minute) to alert occupants 150 of building 10 of an emergency situation or regarding the presence of a fire 180. A sound notification device can be any component in fire notification devices 114 that alerts occupants of an emergency by providing an aural alert/alarm. In some embodiments, fire notification devices 114 emit signals ranging from approximately 500 Hz (low frequency) to approximately 3 kHz (high frequency).

Fire alarm control panel 112 can be any computer capable of collecting and analyzing data from the fire notification system (e.g., building controllers, conventional panels, addressable panels, etc.). In some embodiments, fire alarm control panel 112 is directly connected to fire notification device 114 through IDNAC power. In some embodiments, fire alarm control panel 112 can be communicably connected to a network for furthering the fire suppression process, including initiating corrective action in response to detection of a fire.

In some embodiments, fire detection devices 118 are configured to detect a presence of fire in an associated room 160. Fire detection devices 118 may include any temperature sensors, light sensors, smoke detectors, etc., or any other sensors/detectors that detect fire. In some embodiments, fire detection devices 118 provide any of the sensed information to fire alarm control panel 112.

Figure 3:
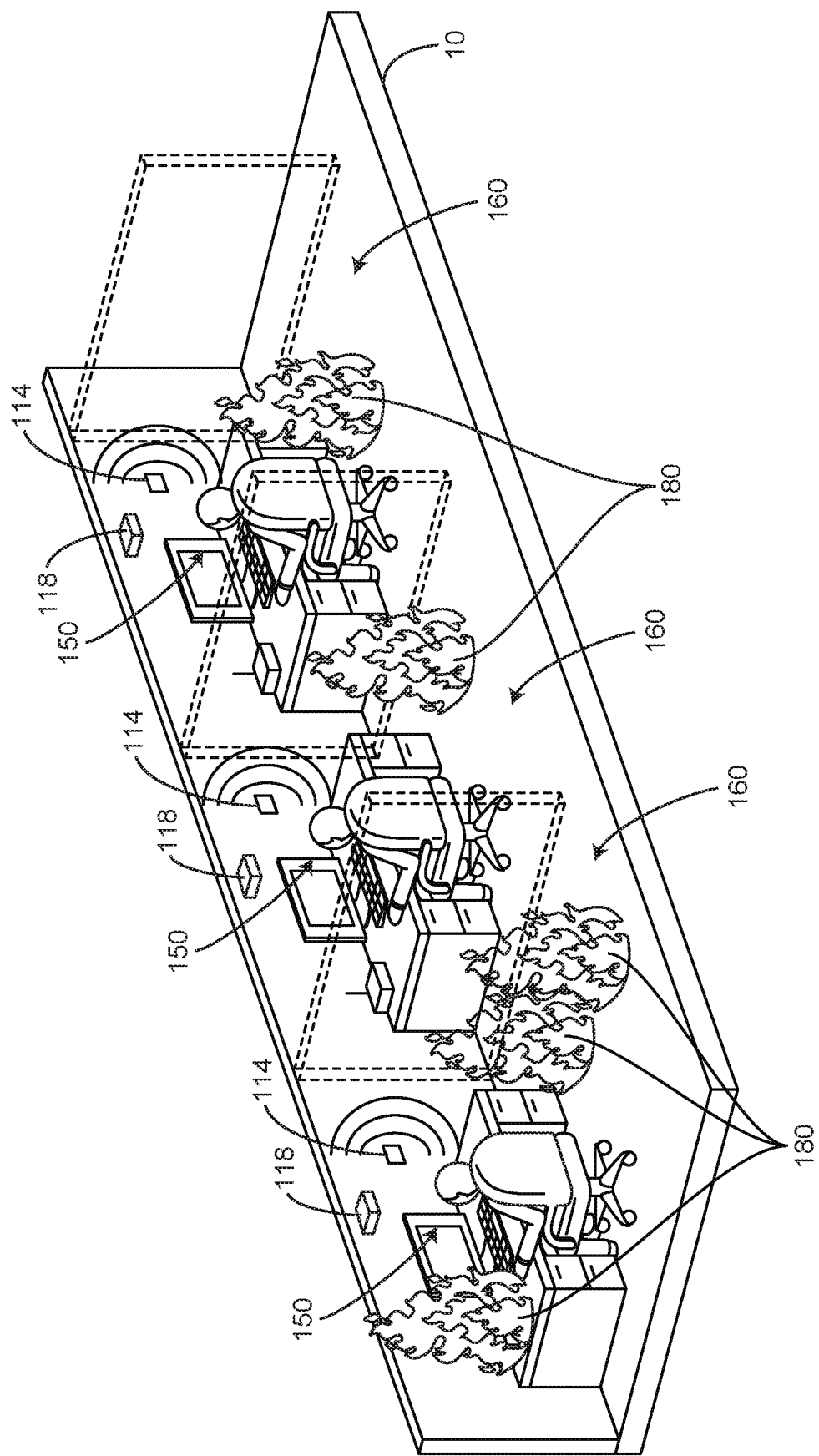
FIG. 3 is a perspective view of various rooms of the building of FIG. 1, including occupants, notification devices, and fire detection devices of the fire system, according to some embodiments.

Referring particularly to FIG. 3, a perspective view of various rooms of building 10 is shown, according to some embodiments. In some embodiments, fire detection devices 118 are configured to monitor any of a temperature, a light intensity, a presence of smoke, etc., of a corresponding room/space 160 of building 10. Fire detection devices 118 can be configured to locally perform a fire detection process to determine if a fire 180 is present in room/space 160 based on the sensed data (e.g., the sensed room temperature, the sensed light intensity in room 160, the sensed smoke in room 160, etc.), according to some embodiments. In some embodiments, fire detection devices 118 provide any of the sensed information (e.g., the room temperature of room 160, the light intensity within room 160, the presence of smoke within room 160, etc.) to fire alarm control panel 112. Fire alarm control panel 112 is configured to receive any of the sensor information from any of fire detection devices 118 throughout building 10 and perform a fire detection process to determine if a fire 180 is present in any rooms/spaces 160 of building 10, according to some embodiments. In some embodiments, fire alarm control panel 112 is configured to cause fire notification devices 114 to provide any of a visual and/or an aural alert to occupants 150 in response to determining that a fire 180 is present in one of rooms 160 of building 10. In some embodiments, fire alarm control panel 112 is configured to cause a specific fire notification device 114 to provide an alarm/alert to an occupant 150 of a particular room/space 160 in response to determining that a fire 180 is present in the particular room/space 160 of building 10.

In some embodiments, fire alarm control panel 112 is configured to provide a BMS controller 366 (see FIG. 4) with a status of any of fire notification devices 114 and/or any of the collected information/data from fire detection devices 118. For example, fire alarm control panel 112 may provide BMS controller 366 with an indication of a current status (e.g., normal mode, alarm mode, etc.) of any of fire notification devices 114. In some embodiments, fire alarm control panel 112 is configured to cause one or more of fire suppression device 116 to suppress the fire in response to determining that a fire is present in building 10. In some embodiments, fire alarm control panel 112 is configured to cause a particular fire suppression device 116 to suppress a fire in a particular room/space 160 in response to determining that a fire 180 is present in the particular room/space 160. In some embodiments, fire alarm control panel 112 is configured to provide BMS controller 366 with a status (e.g., activated, dormant, etc.) of any or all of fire suppression devices 116.

Fire Detection System

Figure 4:
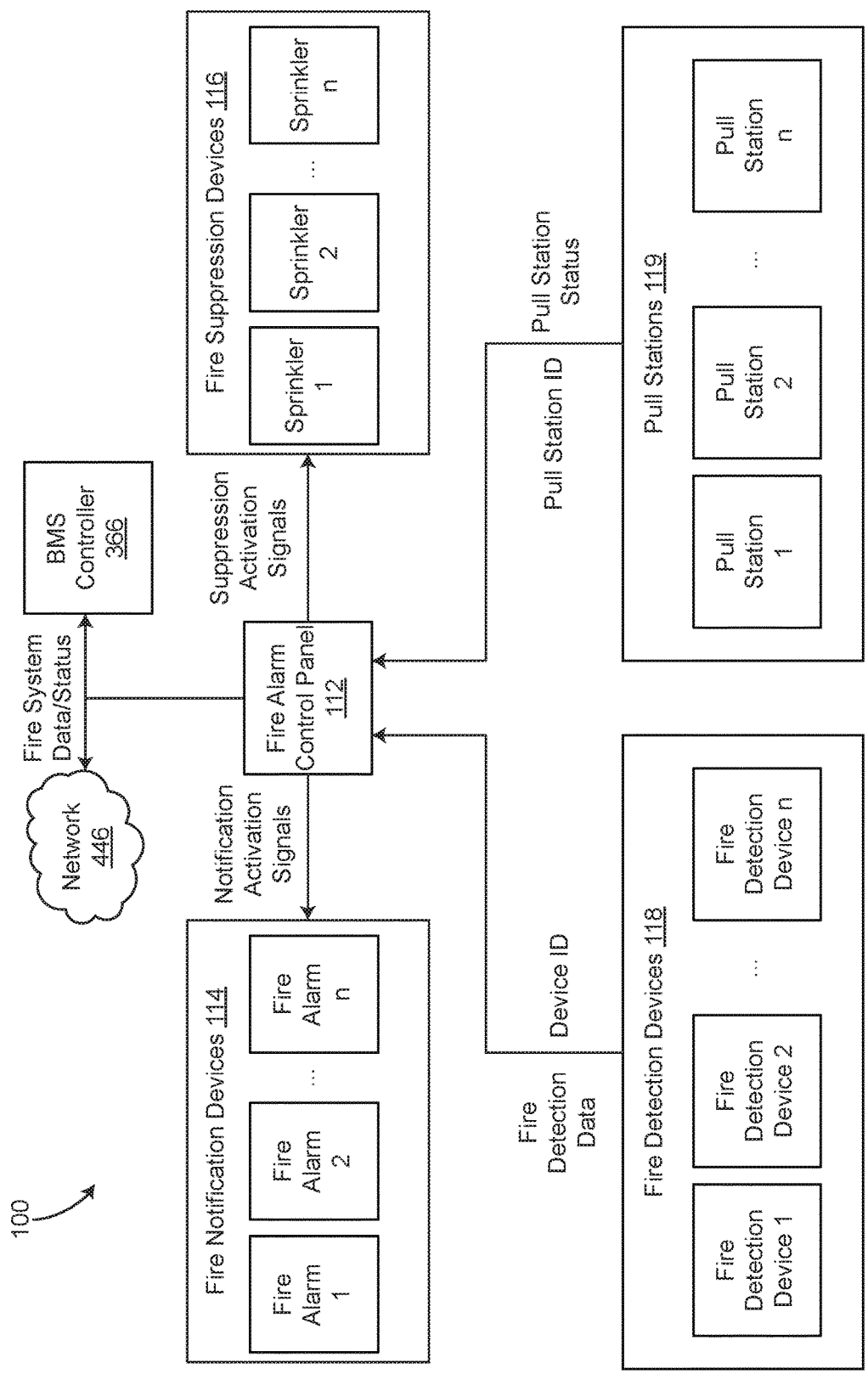
FIG. 4 is a block diagram of the fire system of FIG. 1, according to some embodiments.

Referring particularly to FIG. 4, fire system 100 is shown in greater detail, according to some embodiments. As shown, fire alarm control panel 112 can be configured to receive any fire detection data (e.g., smoke detection, heat/temperature detection, light intensity detection, etc.) from any of fire detection devices 118. In some embodiments, fire alarm control panel 112 also receives a unique device ID (e.g., an identification number, an identification code, etc.) from each of fire detection devices 118. In some embodiments, fire alarm control panel 112 is configured to determine a location in building 10 of each of fire detection device 118 based on the unique device ID received from each of fire detection devices 118. For example, fire alarm control panel 112 can determine that a particular fire detection device 118 is located in a certain room, on a certain floor of building 10.

In some embodiments, fire alarm control panel 112 also receives pull station status information from any of pull stations 119 throughout building 10. In some embodiments, fire alarm control panel 112 is configured to receive a unique pull station ID (e.g., an identification number, an identification name, a unique ID code, etc.) from each of pull stations 119. In some embodiments, fire alarm control panel 112 is configured to perform a fire detection process based on any of the pull station status information received from pull stations 119 and the fire detection data received from fire detection devices 118. Fire alarm control panel 112 can also determine an approximate location of a fire based on the received device IDs of fire detection devices 118 and the received pull station IDs from pull stations 119.

In some embodiments, fire alarm control panel 112 is configured to cause fire notification devices 114 and/or fire suppression devices 116 to activate in response to determining that a fire is present in building 10. In some embodiments, fire alarm control panel 112 uses a database of locations corresponding to each of the unique device IDs of fire detection devices 118 and pull stations 119. In some embodiments, fire alarm control panel 112 is configured to determine an approximate location in building 10 of the fire. In some embodiments, fire alarm control panel 112 is configured to cause particular fire notification devices 114 and particular fire suppression devices 116 to activate in response to determining that a fire is present in a particular room 160 of building 10.

For example, fire alarm control panel 112 may cause all of fire notification devices 114 to activate in response to determining that a fire is present in any room 160 of building 10. In some embodiments, fire alarm control panel 112 is configured to cause only fire suppression devices 116 that are proximate the location of the detected fire to activate. For example, fire alarm control panel 112 may cause all fire notification devices 114 to activate in response to determining a fire is present in one room 160 of building 10 (to cause occupants 150 to evacuate building 10), but may only activate fire suppression devices 116 that are in the particular room where the fire is present.

In some embodiments, fire detection devices 118 are configured to perform a fire detection process locally and are communicably connected with fire notification devices 114. In some embodiments, fire detection devices 118 are configured to provide fire alarm control panel 112 with an indication of whether a fire is present nearby fire detection devices 118. In some embodiments, fire detection devices 118 are configured to cause fire notification devices 114 to activate in response to determining that a fire is present nearby. In some embodiments, fire detection devices 118 are configured to control an operation of fire suppression devices 116. In some embodiments, fire detection devices 118 are configured to cause one or more (e.g., the nearest) of fire suppression devices 116 to activate in response to detecting a fire.

In some embodiments, fire alarm control panel 112 is configured to provide a status of fire system 100 to network 446 and/or BMS controller 366. For example, fire alarm control panel 112 may provide a status of each of fire suppression devices 116 (e.g., activated or dormant), a status of each of fire notification devices 114 (e.g., activated or dormant), a status of each of fire detection devices 118 (e.g., fire detected, no fire detected), and a status of each of pull stations 119 (e.g., activated). In some embodiments, fire alarm control panel 112 also provides network 446 and/or BMS controller 366 with a location of each of fire notification devices 114, fire suppression devices 116, fire detection devices 118, and pull stations 119. In some embodiments, the location includes a floor, room, and relative location within the room of each of fire notification devices 114, each of fire suppression devices 116, each of fire detection devices 118, and each of pull stations 119. For example, fire alarm control panel 112 may provide BMS controller 366 with a status of a particular fire detection device 116, as well as what floor the particular fire detection device 116 is on, as well as a room 160 that the particular fire detection device 116 is in and what wall of the room (e.g., north wall, west wall, etc.) 160 the particular fire detection device 116 is located on. In some embodiments, fire alarm control panel 112 is configured to provide BMS controller 366 with any of the received information from any or all of fire detection devices 118, any or all of pull stations 119, etc. For example, fire alarm control panel 112 may provide BMS controller 366 with any of the smoke detection data, the temperature sensor data, the light intensity data, etc., of each of fire detection devices 118 as well as the corresponding room 160 within which each of fire detection devices 118 are located.

Fire Alarm System

Figure 5:
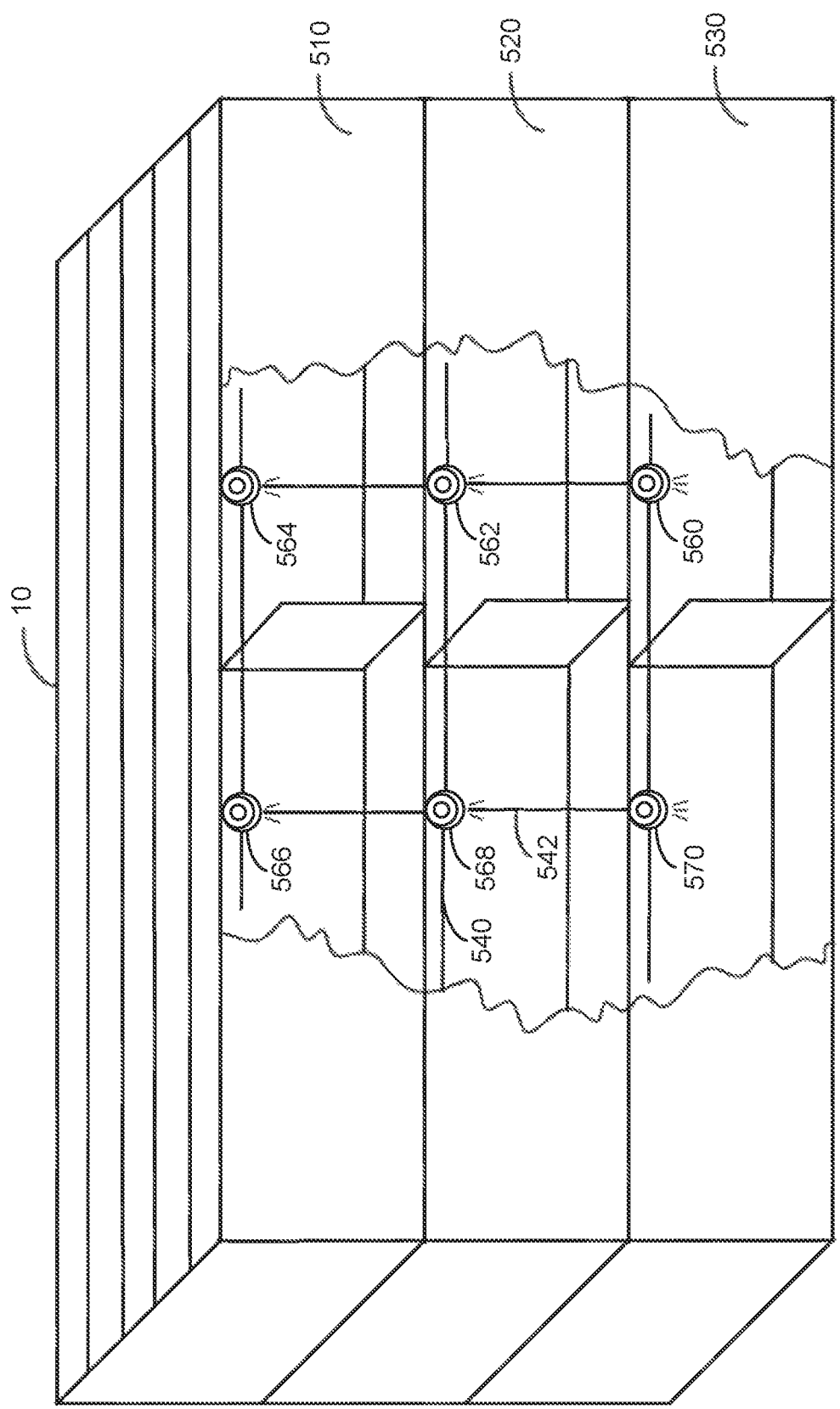
FIG. 5 is a drawing of the building of FIG. 1 equipped with a wireless mesh network, according to some embodiments.
Figure 6:
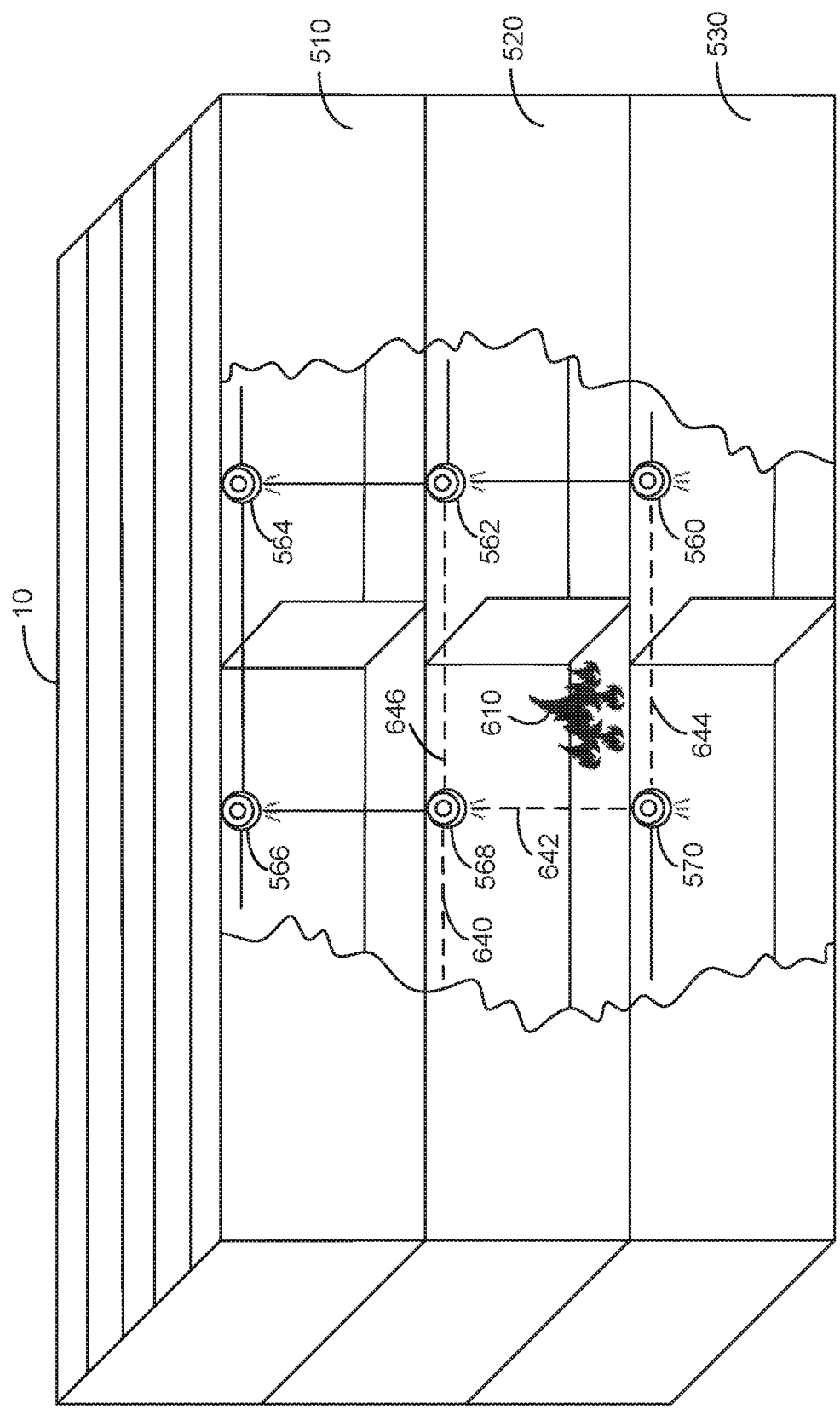
FIG. 6 is a drawing of the building of FIG. 1 equipped with a wireless mesh network responding to a fire, according to some embodiments.

Turning now to FIGS. 5-6, drawings of a wireless mesh network responding to a fire are shown, according to various embodiments. Building 10 includes a plurality of wireless mesh nodes 720, 730, 740, 750, 760. Building 10 may include one or more wireless mesh nodes that may or may not be configured to transmit and receive data. For example, wireless mesh node 760 may be wireless connected to both wireless mesh nodes 750 and 720 through transponders configured to transmit and receive radio signals. Due to current wireless technology allowing wireless communication between building floors, wireless mesh nodes 750 and 730 on floor 520 may be wirelessly connected to wireless mesh nodes 760 and 720 on floor 530.

Referring now to FIG. 5, a drawing of a wireless mesh network operating in normal environmental conditions is shown. In some embodiments, normal environmental conditions can be shown to mean any conditions that do not include significantly high temperatures that would indicate nearby combustion. In some embodiments, wireless mesh network 700 is implemented inside of building 10. The plurality of wireless mesh nodes 720, 730, 740, 750, 760 may be wireless connected to transmit radio signals. For example, wireless mesh node 760 may transmit radio signal 542 to wireless mesh node 750. Building 10 may include multiple wireless mesh nodes on multiple floors on a larger scale than what is outlined in FIG. 5. This is shown by wireless mesh node 750 transmitting a signal 540 to another part of building 10. Because building 10 is shown to be operating in normal environmental conditions, the transmitted radio signals exemplified by signals 540, 542 are considered to be stable and normal signals that may be used as a baseline reading.

Referring now to FIG. 6 a drawing of a wireless mesh network operating in abnormal environmental conditions is shown. Abnormal environmental conditions can be shown to mean any conditions that include significantly high temperatures that would indicate nearby combustion. In some embodiments, increased radio energy absorbed by water molecules occurs due to a fire 610. This may affect the signal strength of transmitted signals between the wireless mesh nodes. For example, fire 610 may induce signal distortion in signal 640, 642, 644 and signal 646 from wireless mesh node 568. As distance from fire 610 increases, the quantity of water molecules excited to absorb radio energy may decrease. This can result in a negative correlation between the distance from fire 610 and signal distortion resulting from combustion, allowing a method for pinpointing the specific location of a fire in building 10.

Figure 7:
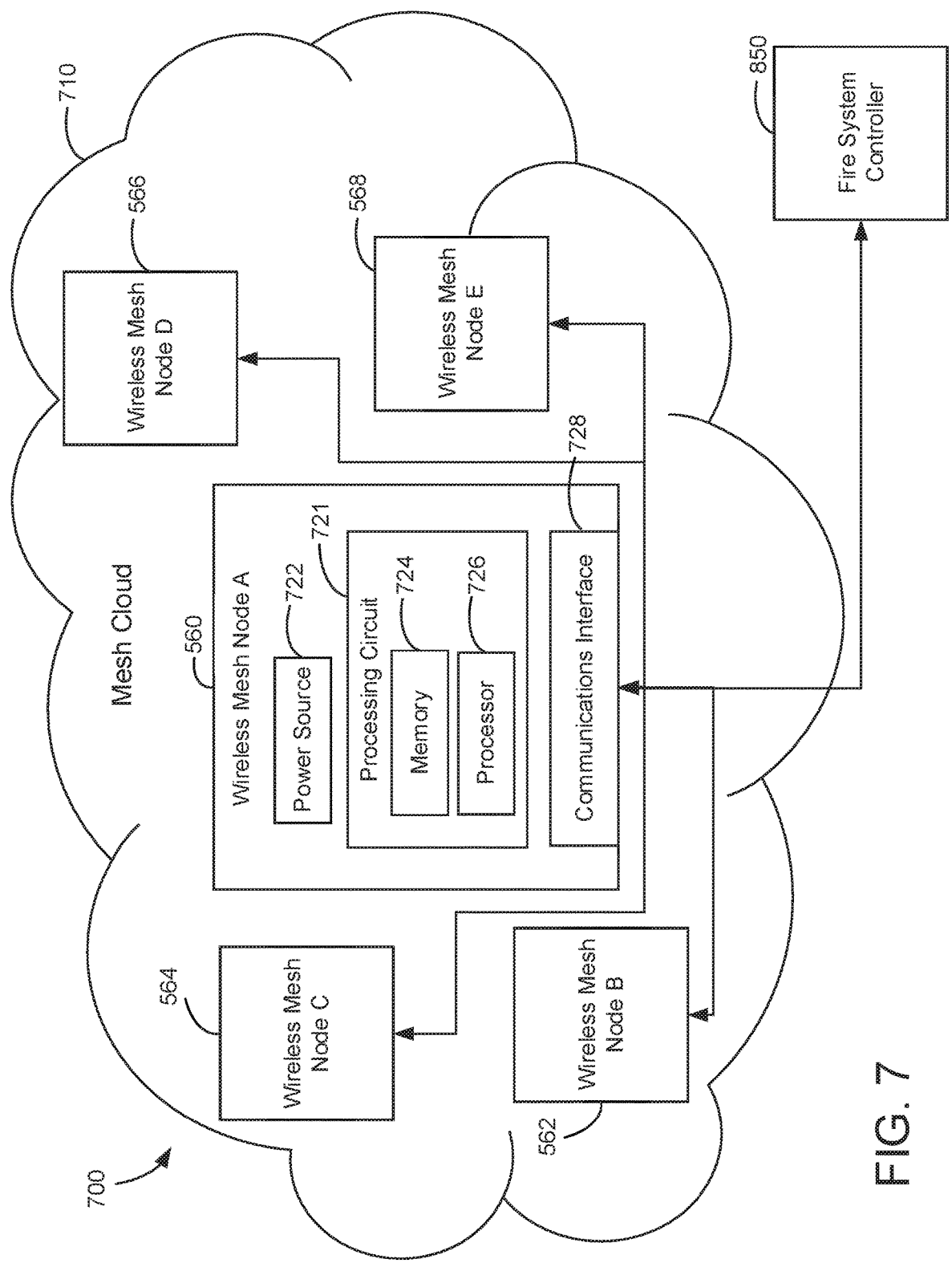
FIG. 7 is a block diagram of a wireless mesh network which can be used as part of the fire system of FIG. 1, according to some embodiments.
Figure 8:
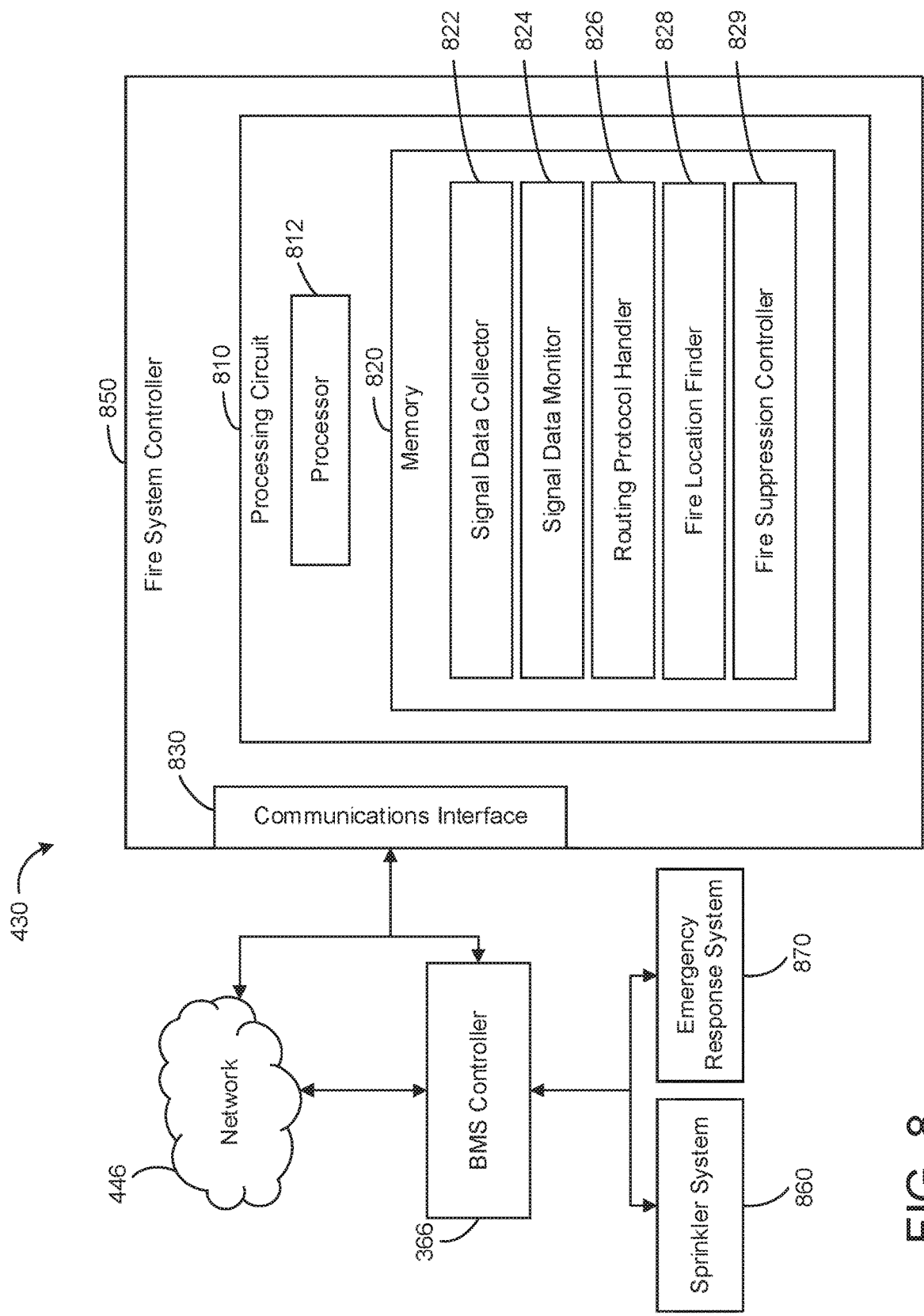
FIG. 8 is a further block diagram of the fire system of FIG. 1 which can be used in a BMS, according to some embodiments.

Turning now to FIGS. 7-8 systems for building fire detection and suppression are shown, according to some embodiments. FIG. 7 outlines a wireless mesh network 700 and a plurality of wireless mesh nodes therein, configured to transmit and receive signals between the different wireless mesh nodes. Information regarding these signals are collected in fire system controller 850 for analysis regarding building fire detection. Once a fire is detected, a signal is sent to BMS controller 366 to engage in corrective action for building fire suppression.

Referring now to FIG. 7, wireless mesh network 700 is shown, according to an exemplary embodiment. Wireless mesh network 700 may act as a collection of wireless mesh nodes configured to monitor signals in mesh cloud 710. Mesh cloud 710 may contain a plurality of wireless mesh nodes, such as wireless mesh nodes 720, 730, 740, 750, and 760. Wireless mesh nodes in mesh cloud 710 may be configured to monitor the signal characteristics of the signals transmitted and received by the plurality of wireless mesh nodes. Signal characteristics may include but are not limited to link quality, signal strength, bit rate and other signal characteristics. Link quality characteristics focus primarily on the quality of the signal, such as bit error ratio, where the number of bit errors occurring over a specified period of time is monitored. Signal strength may represent the power output of the signal transmitted from one mesh node to another mesh node, measured at the location of the mesh node that receives the signal. Bit rate may represent the number of bits per second that can be transmitted across a digital network.

Wireless mesh cloud 710 can be shown to include a plurality of wireless mesh nodes including wireless mesh nodes 720, 730, 740, 750, and 760. In some embodiments, wireless mesh cloud 710 may only refer to the collection of wireless mesh nodes and not an entire wireless network. For example, mesh cloud 710 includes wireless mesh nodes 720, 730, 740, 750, and 760 and wireless mesh network 700 includes mesh cloud 710 and fire system controller 850.

Wireless mesh node 720 is shown to include a power source 722, a processing circuit 721, and a communications interface 728. Power source 722 may include a battery attached to wireless mesh node 720, an external AC power source wired to wireless mesh node 720, or a combination of both. In some embodiments, wireless mesh node 720 may act as any active electronic device in wireless mesh network 700 that aids in moving and/or producing data. For example, wireless mesh node 720 communicates with wireless mesh node 730 and routes data to fire system controller 850. In other embodiments, wireless mesh nodes in mesh cloud 710 may be directly connected to sprinklers in sprinkler system 860. In other embodiments, wireless mesh nodes in mesh cloud 710 may be integrated into components of sprinkler system 860 or into components of emergency response system 870. For example, wireless mesh node 560 can be directly connected to a fire alarm in emergency response system 870 such that both components are powered by power source 722.

Communications interface 728 may include wired or wireless communications interfaces (e.g., jacks, antennas, transmitters, receivers, transceivers, wire terminals, etc.) for conducting data communications with fire system 100, BMS controller 366, or other external systems or devices. In various embodiments, communications via interface 728 can be direct (e.g., local wired or wireless communications) or via a communications network 446 (e.g., a WAN, the Internet, a cellular network, etc.). For example, interface 728 can include an Ethernet card and port for sending and receiving data via an Ethernet-based communications link or network. In another example, interface 728 can include a Wi-Fi transceiver for communicating via a wireless communications network. In another example, communications interface 728 can include cellular or mobile phone communications transceivers. In one embodiment, communications interface 728 is a power line communications interface to communicate with BMS controller 366. In other embodiments, communications interface 728 is an Ethernet interface that is the same interface the BMS controller 366 uses to communicate with other systems of building 10.

Processing circuit 721 is shown to include a processor 726 and memory 724. Processor 726 can be implemented as a general purpose processor, an application specific integrated circuit (ASIC), one or more field programmable gate arrays (FPGAs), a group of processing components, or other suitable electronic processing components. Memory 724 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 724 can include database components, object code components, script components, or any other type of information structure for supporting the various activities and information structures described in the present application. According to an example embodiment, memory 724 is communicably connected to processor 726 via processing circuit 721 and includes computer code for executing (e.g., by processing circuit 721 and/or processor 726) one or more processes described herein.

Processing circuit 721 may include an embedded routing algorithm that communicably connects to communications interface 728 to dynamically route data to and from the different mesh nodes within mesh cloud 710. In some embodiments, one or more wireless mesh node may be connected to a server. For example, wireless mesh node 720 is directly connected to fire system controller 550 through communications interface 728, while wireless mesh nodes 730, 740, 750, and 760 are wireless connected to each other in wireless mesh network 700.

Still referring to FIG. 7, wireless mesh network 700 is connected to fire system controller 850. In some embodiments fire system controller may include a memory component that includes one or more functional modules that configure fire system controller 850 to operate as a server for a wireless mesh network 700. In some wireless mesh networks, only one mesh node is connected to a server. For example, fire system controller 850 be directly connected to only wireless mesh node 720, but is communicably connected to and actively storing data from entire mesh cloud 710.

Referring now to FIG. 8, a further block diagram of a fire system 100 is shown, according to an exemplary embodiment. Fire system 100 is shown to include a fire system controller 850 which can communicate with BMS controller 366, sprinkler system 860, emergency response system 870, various other components of building 10, and/or external systems or devices. Fire system controller 850 may act as a controller that focuses primarily on monitoring fire system 100. In some embodiments, the actions of fire system controller 850 are performed by BMS controller 366. In other embodiments, fire system controller 850 is connected to network 446, directly connected to BMS controller 366 or a combination of both. For example, fire system controller 850 inputs data from wireless mesh network 700 and analyzes the data for abnormal signal characteristics. When a decrease in signal strength is observed, fire system controller 850 may send a signal to BMS controller 366 for fire suppression. BMS controller 366 may then engage sprinkler system 860 and/or contact emergency responders through emergency response system 870.

Fire system controller 850 is shown to include a communications interface 830 and a processing circuit 810. Communications interface 830 can be or include wired or wireless communications interfaces (e.g., jacks, antennas, transmitters, receivers, transceivers, wire terminals, etc.) for conducting data communications with BMS controller 366, network 446 sprinkler system 860, emergency response system 870, or other external systems or devices. In various embodiments, communications via interface 830 can be direct (e.g., local wired or wireless communications) or via a communications network 446 (e.g., a WAN, the Internet, a cellular network, etc.). For example, communications interface 830 can include an Ethernet card and port for sending and receiving data via an Ethernet-based communications link or network. In another example, communications interface 830 can include a Wi-Fi transceiver for communicating via a wireless communications network. In another example, communications interface 830 can include cellular or mobile phone communications transceivers. In one embodiment, communications interface 830 is a power line communications interface or an Ethernet interface.

Processing circuit 810 is shown to include a processor 812 and a memory 820. Processing circuit 812 can be communicably connected to communications interface 830 such that processing circuit 810 and various components thereof can send and receive data via communications interface 830. Processor 812 can be implemented as a general purpose processor, an application specific integrated circuit (ASIC), one or more field programmable gate arrays (FPGAs), a group of processing components, or other suitable electronic processing components.

Memory 820 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 820 can be or include volatile memory or non-volatile memory. Memory 820 can include database components, object code components, script components, or any other type of information structure for supporting the various activities and information structures described in the present application. In some embodiments, memory 820 is communicably connected to processor 812 via processing circuit 810 and includes computer code for executing one or more processes described herein.

Still referring to FIG. 8, memory 820 is shown to include a signal data collector 822, a signal data monitor 824, a routing protocol handler 826, and a fire location finder 828. Signal data collector 822 can be configured to collect information on the plurality of signal characteristics from the mesh network signals. In some embodiments, signal data collector 822 may store data that indicates the link quality of the signal, signal strength, bit rate, and other signal characteristics. Link quality may be an overall representation of a signal that takes multiple characteristics into account. This may include monitoring the bit error ratio, where the number of bit errors occurring over a specified period of time is monitored. Signal strength may represent the power of the signal transmitted from one mesh node to another mesh node, measured at the location of the mesh node that receives the signal. In some embodiments, signal data collector 522 can be configured to monitor and detect changes in signal strength reported by the mesh nodes. Bit rate may represent the number of bits per second that can be transmitted across a digital network.

Signal data monitor 824 can be any component that is monitoring signal characteristics inside of fire system controller 850. For example, signal data monitor can monitor data that indicates link quality of the signal, signal strength, bit rate, and other signal characteristics.

Routing protocol handler 826 may be configured to manage the routed data coming into fire system controller 850 by use of a routing table. For example, as wireless mesh nodes 720, 730, 740, 750, and 760 are communicating, packets of data may be sent to and from the different nodes in mesh cloud 710. These packets of data can be routed to fire system controller 850 for analysis, but the packets of data from the nodes may show up at different intervals. It is therefore useful that fire system controller 850 be configured to read the address of the incoming data packet and process it accordingly.

In some embodiments, fire location finder 828 can be any component that utilizes both building schematics and abnormal signal data from wireless mesh network 700 to pinpoint a specific location of a fire. Fire suppression controller 829 can be the means of a building controller responsible for engaging in fire suppression, up to and including engaging sprinkler system 860 and emergency response system 870. In some embodiments, this task is performed by BMS controller 366. In other embodiments, fire system controller may be responsible for some or all of the building fire detection and suppression.

In some embodiments, fire system controller 850 may input and analyze some or all of the raw data coming in from the mesh network to detect a fire. Once a fire is detected, fire system controller 850 may then send information to BMS controller 366 for further fire suppression. In other embodiments, fire system controller 850 may be a component of BMS controller 366 and BMS controller 366 handles some or all of the raw data coming in from the mesh network. As shown in FIG. 8, fire system controller 850 is a separate component from that of BMS controller 366 and is responsible for the systems and methods of fire detection in building 10.

Still referring to FIG. 8, fire system 100 can be integrated with the systems of building 10 and, by extension, sprinkler system 860 and emergency response system 870 through network 446. Sprinkler system 860 can any fire protection/suppression method consisting of a water supply system. In some embodiments, sprinkler system 860 may include a plurality of sprinkler heads located in one or more rooms on one or more floors, linked together by an internal piping system for the water supply. Emergency response system 870 can be any means for notifying and/or engaging first responders to an emergency. This system can also include notifying the building occupants of an emergency (e.g. fire alarm, PA speaker message, strobe light, etc.).

Fire Detection Processes

Figure 9:
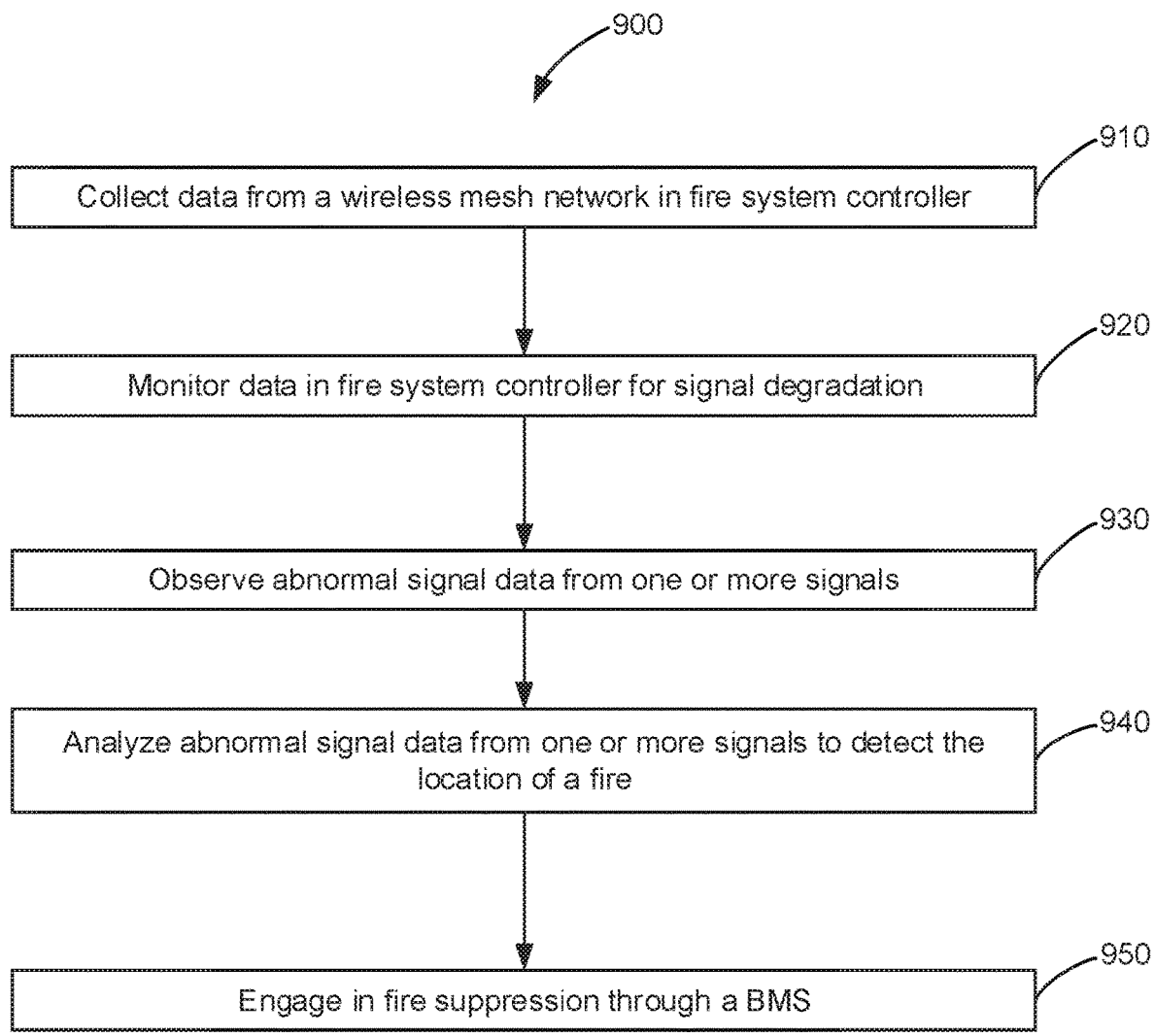
FIG. 9 is a flowchart of a process of detecting fire through a network of radio transceivers that can be performed by the fire system of FIG. 8, according to some embodiments.

Referring now to FIG. 9, a process 900 for detecting and suppressing fires based on analysis of abnormal radio frequency signals is shown, according to an exemplary embodiment. Process 900 can be performed by fire system controller 850 and/or other components of fire system 100, as outlined in FIGS. 1 and 8.

Process 900 is shown to include collecting data from a wireless mesh network (step 910). In some embodiments, all wireless mesh nodes in wireless mesh network 700 route data to and from other wireless mesh nodes on the network using a routing algorithm. This data may be information regarding the signals in wireless mesh network 700. In some embodiments, this may include the link quality of the signal, signal strength, bit rate, and other signal characteristics. Link quality may be an overall representation of a signal takes multiple characteristics into account. This may include monitoring the bit error ratio, where the number of bit errors occurring over a specified period of time is monitored. Signal strength may represent the power of the signal transmitted from one mesh node to another mesh node, measured at the location of the mesh node that receives the signal. Bit rate may represent the number of bits per second that can be transmitted across a digital network. Only one wireless mesh node may be directly connected to fire system controller 850 in some embodiments. For example, fire system controller 850 may act as a server connected to a singular wireless mesh node 720. In other embodiments, two or more of wireless mesh nodes 720-760 may be directly connected to fire system controller 850.

Process 900 is shown to include monitoring data in a controller for abnormal signal characteristics (step 910). Step 910 can be performed by controller 850 in wireless mesh network 700, where it can be configured to input signal data from the mesh network and analyze it for abnormal signal characteristics. Signal characteristics can be brought in to fire system controller 850 as packets of data from the mesh network. Due to potential network traffic, routing protocol handler 826 can re-organize any incoming data packets that are out-of-order and store the data in signal data collector 822. Signal data monitor 824, which can be any component that is monitoring signal characteristics inside of fire system controller 850, may monitor the stored data for abnormal characteristics based on link quality of the signal, signal strength, bit rate, and other signal characteristics. When abnormal signal characteristics are observed by fire system controller 850 and a fire has been detected, fire location finder 828 uses information on building schematics and the location of the wireless mesh nodes to pinpoint the location of the fire. Fire location finder 828 can be any component that utilizes both building schematics and abnormal signal data from wireless mesh network 700 to pinpoint a specific location of a fire.

Process 900 is shown to include observing abnormal signal data from one or more signals (step 930). Due to the phenomenon of radio energy being absorbed by water molecules at a given frequency, signal data that details a degradation in the quality, signal strength, bit rate, and other characteristics indicate a potential fire at the location at or near those degraded signals. Fire location finder 828 is able to pinpoint where this potential fire may be, based on the 3-dimensional structure of wireless mesh nodes and the proximity of the potentially abnormal signals.

Process 900 is shown to include analyzing abnormal signal data from one or more signals to detect the location of a fire (step 940). For example, signal data monitor 824 monitors signal characteristics inside of fire system controller 850. When abnormal signal characteristics are detected, fire location finder 828 utilizes both building schematics and abnormal signal data from wireless mesh network 700 to pinpoint a specific location of a fire.

Process 900 is shown to include engaging in fire suppression through a BMS (step 950). In some embodiments, sprinkler system 860 and emergency response system 870 can be engaged by BMS controller 366. Engaging fire suppression can include any means taken as corrective action for suppressing a fire. Corrective action may be performed in BMS controller 366 or a separate controller responsible for fire safety, such as fire system controller 850.

Figure 10:
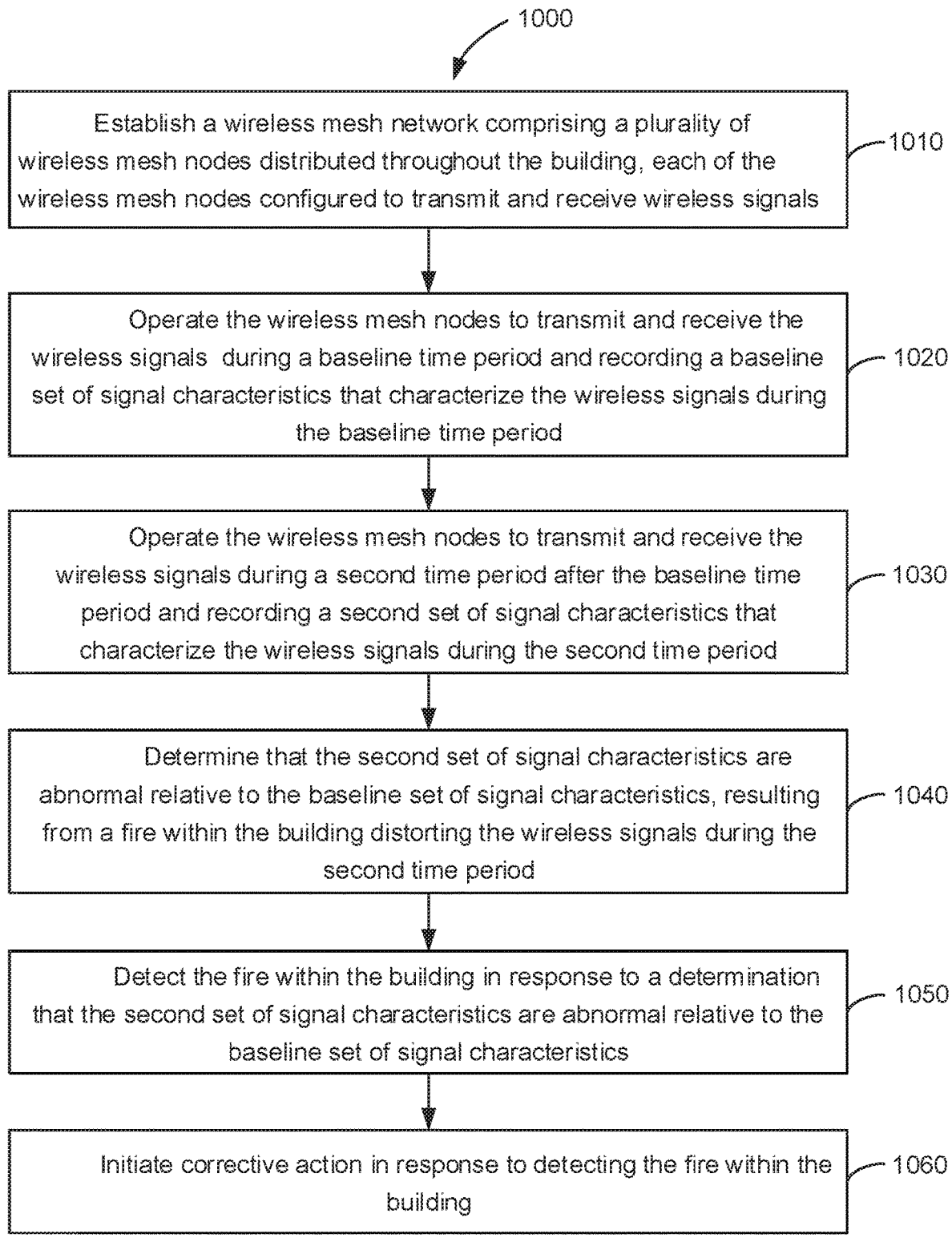
FIG. 10 is a flowchart of a process for a detecting and suppressing fires which can be performed by the fire system of FIG. 8, according to some embodiments.

Referring now to FIG. 10 a process 1000 for detecting a building fire location by analyzing abnormal radio frequency signals due to combustion is shown, according to an exemplary embodiment. In some embodiments, process 1000 is performed by one or more components of wireless mesh network 700, as outlined in FIG. 7.

Process 1000 is shown to include establishing a wireless mesh network comprising a plurality of wireless mesh nodes distributed throughout the building, each of the wireless mesh nodes configured to transmit and receive wireless signals (step 1010). The wireless mesh nodes may transmit and receive radio signals through transponders, allowing them to both transmit and receive radio signals. This provides an ability for data to be routed and sent to a server for further analysis. For example, step 1010 may include establishing a wireless mesh network 700 that includes a network of wireless communication devices, such as mesh cloud 710, wireless mesh nodes 720-760, and fire system controller 850.

Process 1000 is shown to include operating the wireless mesh nodes to transmit and receive the wireless signals during a baseline time period and recording a baseline set of signal characteristics that characterize the wireless signals during the baseline time period (step 1020). In some embodiments, this step may be performed by all of the wireless mesh nodes in wireless mesh cloud 710. To monitor abnormal signal characteristics due to radio energy being absorbed by fire, a frequency must be used that excited the water molecules to a level capable of absorbing significant radio energy. For example, this first frequency could be configured to operate at the IEEE 802.11 wireless communication specifications, allowing the network to operate at 2.4 to 2.5 GHz. At this frequency, water molecules experience vibrations that allows them to absorb radio energy. One of the byproducts of combustion is water vapor, created by the burning of building materials (e.g., wood). As an increase in water vapor occurs, a great amount of radio energy will be absorbed, if the signal is at such a frequency that allows it to absorb radio energy. Therefore, operating the network at a 2.4 to 2.5 GHz frequency band will yield a positive correlation between combustion and absorbed radio energy. Signal characteristics as defined above, may include but are not limited to: signal strength, link quality, bit rate, and bit error ratio. All wireless mesh nodes may be configured to communicate using this frequency.

Process 1000 is shown to include operating the wireless mesh nodes to transmit and receive the wireless signals during a second time period after the baseline time period and recording a second set of signal characteristics that characterize the wireless signals during the second time period (step 1030). In some embodiments, this step may be performed by all of the wireless mesh nodes in wireless mesh cloud 710. To monitor abnormal signal characteristics due to radio energy being absorbed by fire, a frequency must be used that excited the water molecules to a level capable of absorbing significant radio energy. In some embodiments, the frequency can be in the range of 2.4 to 2.5 GHz.

Process 1000 is shown to include determining that the second set of signal characteristics are abnormal relative to the baseline set of signal characteristics, resulting from a fire within the building distorting the wireless signals during the second time period (step 1040). In some embodiments, abnormal signal characteristics can be determined by signal data monitor 824 in fire system controller 850.

Process 1000 is shown to include detecting the fire within the building in response to a determination that the second set of signal characteristics are abnormal relative to the baseline set of signal characteristics (step 1050). In some embodiments, detecting the fire within the building can be determined by fire 824 in fire location finder 828. BMS controller may then receive the location of the fire and initiative corrective action for fire suppression. In other embodiments, the fire system controller can both analyze the signal data for fire detection and initiate corrective action for fire suppression. For example, fire location finder 828 detects the location of a fire and fire suppression controller 829 engages sprinkler system 860 for fire suppression.

Process 1000 is shown to include initiating corrective action in response to detecting the fire within the building (step 1060). In step 1060 of process 1000, corrective action is initiated through a device in the BMS in response to detecting a fire. For example, BMS controller 366 may act as the device controlling the corrective action. A corrective action may be configured to be a sprinkler system engaging for fire suppression or a notification to emergency services. These corrective actions may be location sensitive. For example, if a fire is detected by fire location finder 828 and a signal is sent to BMS controller 366 to engage in fire suppression, BMS controller may engage sprinkler system 860. This system may only turn on the sprinklers in the location where abnormal signals were recorded.

Fire Alarm System Powering Wireless Building Network

Figure 11:
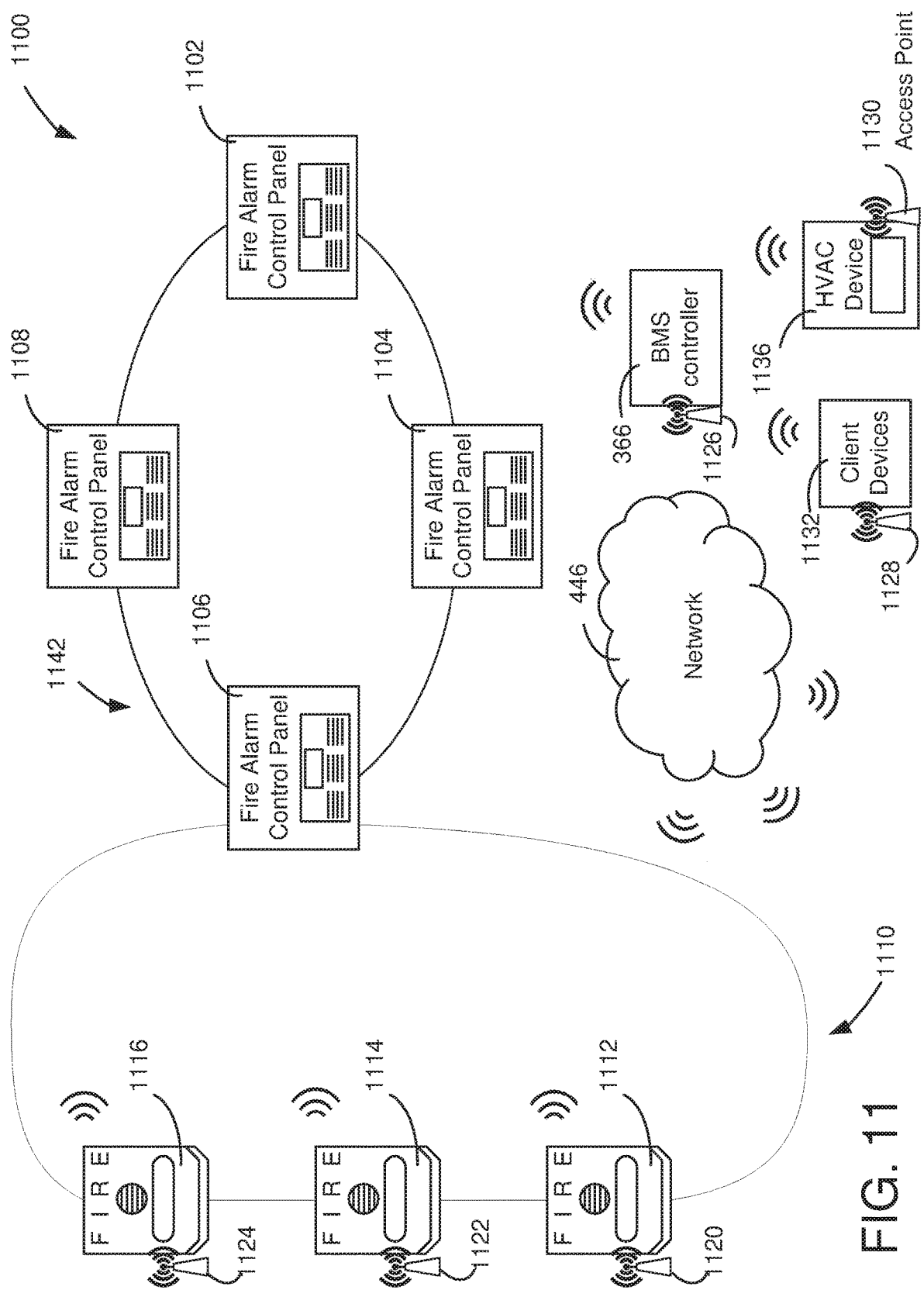
FIG. 11 is a block diagram of a fire alarm system powering a wireless building network, according to some embodiments.

Referring now to FIG. 11, a block diagram of a fire alarm system 1100 powering a wireless building network is shown, according to an exemplary embodiment. FIG. 11 illustrates the interaction between fire notification loop 1110, which can be used within fire system 100, fire panel loop 1142, network 446, and other devices that can be located within a building (e.g., building 10). In some embodiments, fire safety assembly 1112, fire safety assembly 1114, and fire safety assembly 1116 all include one of the devices described with reference to FIG. 4 with respect to fire notification devices 114 in the assembly. Fire safety assembly 1112, fire safety assembly 1114, and fire safety assembly 1116 all communicate with fire alarm control panel 1106 in order to pass along to fire system 100 an alert that a fire has started. In other embodiments, fire notification loop 1110 is a fire detection loop that can be connected to fire alarm control panel 1106 and that contains various devices similar or identical to fire detection devices 118, as described with reference to FIG. 4. Fire alarm control panel 1106 also interacts with BMS controller 366 and network 446, passing on information when a fire is detected. For example, fire alarm control panel 1106 may be alerted and pass along to other building systems (e.g., an HVAC system in building 10) which fire system device triggered the fire alarm in a zone of a building (e.g., designated area, a floor in building 10, etc.). Furthermore, fire alarm control panel 1106 may activate emergency response system 870 shown in FIG. 8 to notify authorities and assistance (e.g., the police department, the fire department, etc.) of the fire, along with information of where the fire is located based on which fire system devices in fire system 100 are detecting the fire.

Fire alarm control panel 1106 can be configured to monitor and control fire system 100. In some embodiments, fire alarm control panel 1106 also communicates with BMS controller 366 in order to carry out additional functions, such as providing electrical energy for operating the other fire system devices, activating fire suppression systems (e.g., sprinkler system 860, fire suppression devices 116, etc.), shutting down industrial equipment (e.g., machine tools, assembly lines, etc.), recalling elevators to designated floors of the building, and operating fans and doors in the building, along with other applications. In some embodiments, fire alarm control panel 1106 has more or less of the same functions as fire alarm control panel 112, as described with reference to FIGS. 1 through 4. Fire alarm control panel 1106 can be a part of a fire panel loop (e.g., fire panel loop 1142) with fire alarm control panel 1108, fire alarm control panel 1102, and fire alarm control panel 1104. In an exemplary embodiment, each fire alarm control panel is located within a different area of a building (e.g., a floor of building 10).

Client devices 1132 can include one or more human-machine interfaces or client interfaces (e.g., graphical user interfaces, reporting interfaces, text-based computer interfaces client-facing web services, web servers that provide pages to web clients, etc.) for controlling, viewing, or otherwise interacting with a communications interface (e.g., communications interface 728). An exemplary embodiment of client devices 1132 can be a computer workstation, a stationary terminal, or a mobile device. For example, client devices 1132 can be a desktop computer, a tablet, a smartphone, or any other type of mobile or non-mobile device. In FIG. 11, client devices 1132 can be wireless infrastructure components that are responsible for creating the wireless building network for a building.

HVAC device 1136 can be a heating, ventilation, and air conditioning device to be used in building 10. An exemplary embodiment of HVAC device 1136 can be a temperature controller, a CO and/or CO2 monitoring device, a humidity monitoring device, air conditioning units, dampers, and other devices that can be used to control the heating, ventilation, and air conditioning systems of a building (e.g., building 10). In some embodiments, HVAC device 1136 can be programmed to notify fire alarm control panel 1106 when a certain temperature, humidity, or gas level is noticed by HVAC device 1136. For example, when a fire starts and combustion produces carbon monoxide, a CO sensor may detect that a dangerous level of carbon monoxide has been reached and notify fire system 100 of the hazard and possibility of a fire spreading within the building.

In some embodiments, other devices within different subsystems of building 10 are communicating with fire notification loop 1110 and fire alarm control panel 1106 through access points (e.g., access point 1126, access point 1128, and/or access point 1130) and network 446 or are implemented into fire notification devices within fire notification loop 1110. For example, a camera used within a security subsystem of a building can be installed within the power housing of fire notification device 1112. Occupancy and movement detection devices, real time location system (RTLS) devices, and repeaters may also be included in the power housing of fire notification devices in fire notification loop 1110, in an exemplary embodiment.

Figure 12:
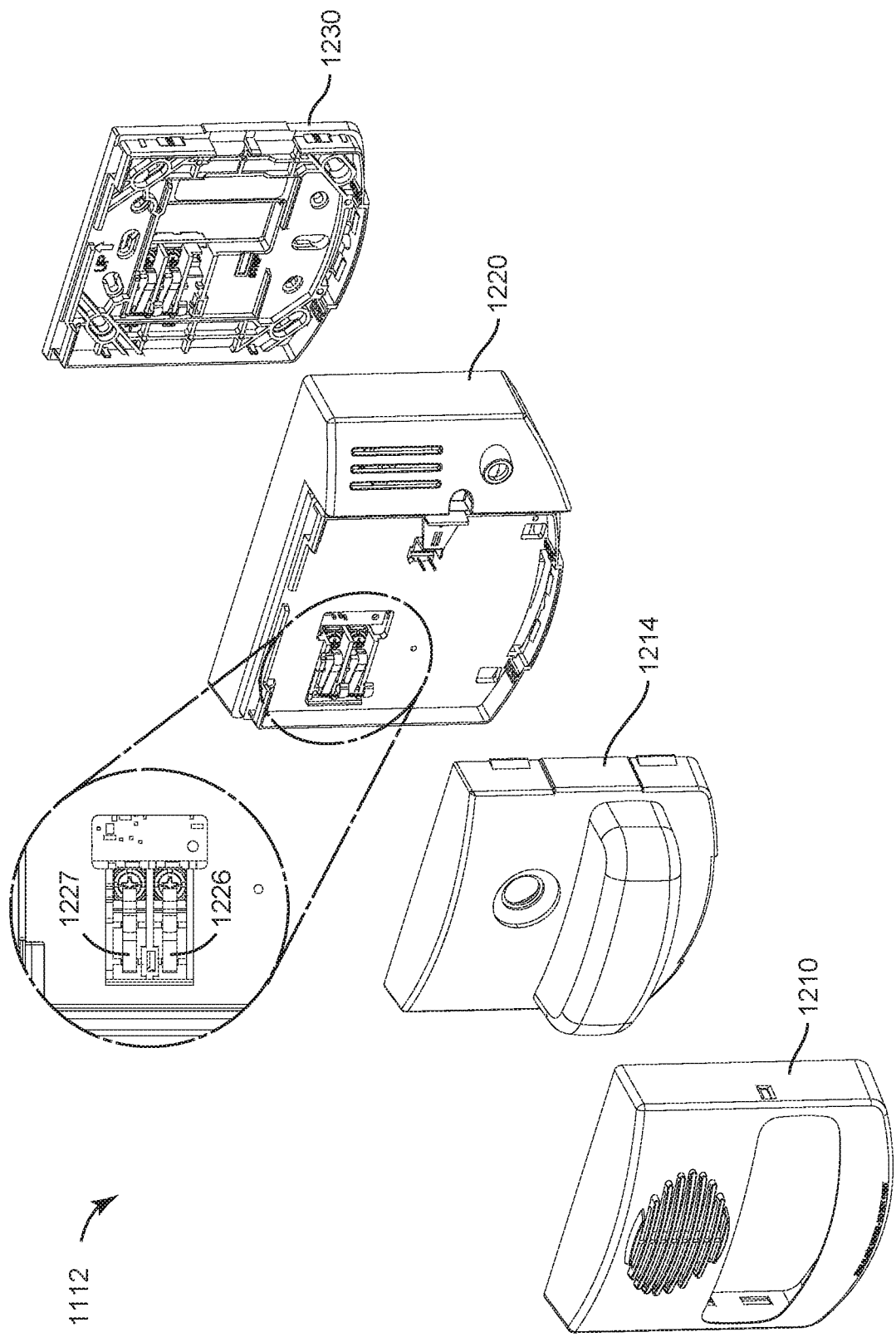
FIG. 12 is an exploded view of a fire safety assembly, which can be implemented in the fire system of FIG. 4, according to some embodiments.

Referring now to FIG. 12, an exploded view of a fire safety assembly 1112, is shown, according to some embodiments. Fire safety assembly 1112 can include some or all of the components and/or functionality of devices in fire system 100 and/or notification device 114, as described with reference to FIG. 4. The fire safety assembly 1112 is shown to include a front cover 1210, fire safety component 1214, wireless infrastructure component 1220, and mounting plate 1230. In other embodiments, fire safety assembly 1112 includes other components of fire devices that may be used in fire system 100 instead of fire safety component 1214. Fire safety component 1214 may be a fire notification device, such as fire notification devices 114, a fire detection device, such as fire detection devices 118, or a different device that may be used in fire system 100. Front cover 1210 can include any protective or decorative component that encompasses the front and/or sides of fire safety component 1214. In some embodiments, front cover 1210 may resemble the traditional plastic red cover found in most fire notification devices in commercial and/or industrial buildings. Front cover 1210 may mechanically couple to the exterior of fire safety component 1214. Mounting plate 1230 can be the portion of fire safety assembly 1112 that wireless infrastructure component 1220 is anchored to in order to be installed (e.g., in a retrofit application). In some embodiments, 1230 is mounted to the walls or ceilings of building 10. In other embodiments, fire safety assembly 1112 includes more components than described with reference to FIG. 12, such as additional components inserted between the wireless infrastructure component and the fire safety component or between the wireless infrastructure component and the mounting plate.

In some embodiments, one side of wireless infrastructure component 1220 is configured to attach to mounting plate 1230 in the identical means that the rear surface of fire safety component 1214 ordinarily attaches to mounting plate 1230. Also, the front surface of wireless infrastructure component 1220 is configured to provide the same mounting interface that is provided by mounting plate 1230. This allows wireless infrastructure component 1220 to be easily inserted between mounting plate 1230 and fire safety component 1214 without needing to modify the native mounting interfaces of either mounting plate 1230 or fire safety component 1214. For example, in an existing building, fire safety component 1214 is already attached directly to mounting plate 1230. The mounting features provided by wireless infrastructure component 1220 allow it to be attached between fire safety component 1214 and mounting plate 1230 (i.e., in a retrofit application). The wireless infrastructure component 1220 attaches to mounting plate 1230 on its surface in the same way that fire safety component 1214 normally attaches to mounting plate 1230, and provides the same mounting interface on its front surface that mounting plate 1230 normally provides to fire safety component 1214. In some embodiments, contact 1226 and contact 1227 are both metal prongs that are secured to holes in fire safety component 1214 in the same way that contacts of mounting plate 1230 would secure to fire safety component 1214 if wireless infrastructure component 1220 were not placed between mounting plate 1230 and fire safety component 1214.

In other embodiments, a fire system component has a mounting interface that allows the wireless infrastructure component to attach to the front of the fire system component instead of between the fire system component and a mounting surface (e.g., mounting plate 1230). For example, instead of wireless infrastructure component 1220 coupling to mounting plate 1230 and then fire safety component 1214 coupling to the front face of wireless infrastructure component 1220, the rear face of fire safety component 1214 directly couples to mounting plate 1230 and the rear face of wireless infrastructure component 1220 attaches to the front face of fire safety component 1214. In some embodiments, the wireless infrastructure component is not installed in a retrofit application and is installed directly to a new mounting surface instead of being attached between a fire system component and a mounting plate. In other embodiments, there is a different insert (e.g., a device component for an HVAC unit) between the wireless infrastructure component and the mounting surface that the wireless infrastructure component is coupled, such as mounting plate 1230. For example, the rear face of wireless infrastructure component 1220 is attached to a front face of a temperature sensor component of an HVAC device, which is then attached to the front face of a mounting surface.

Figure 13:
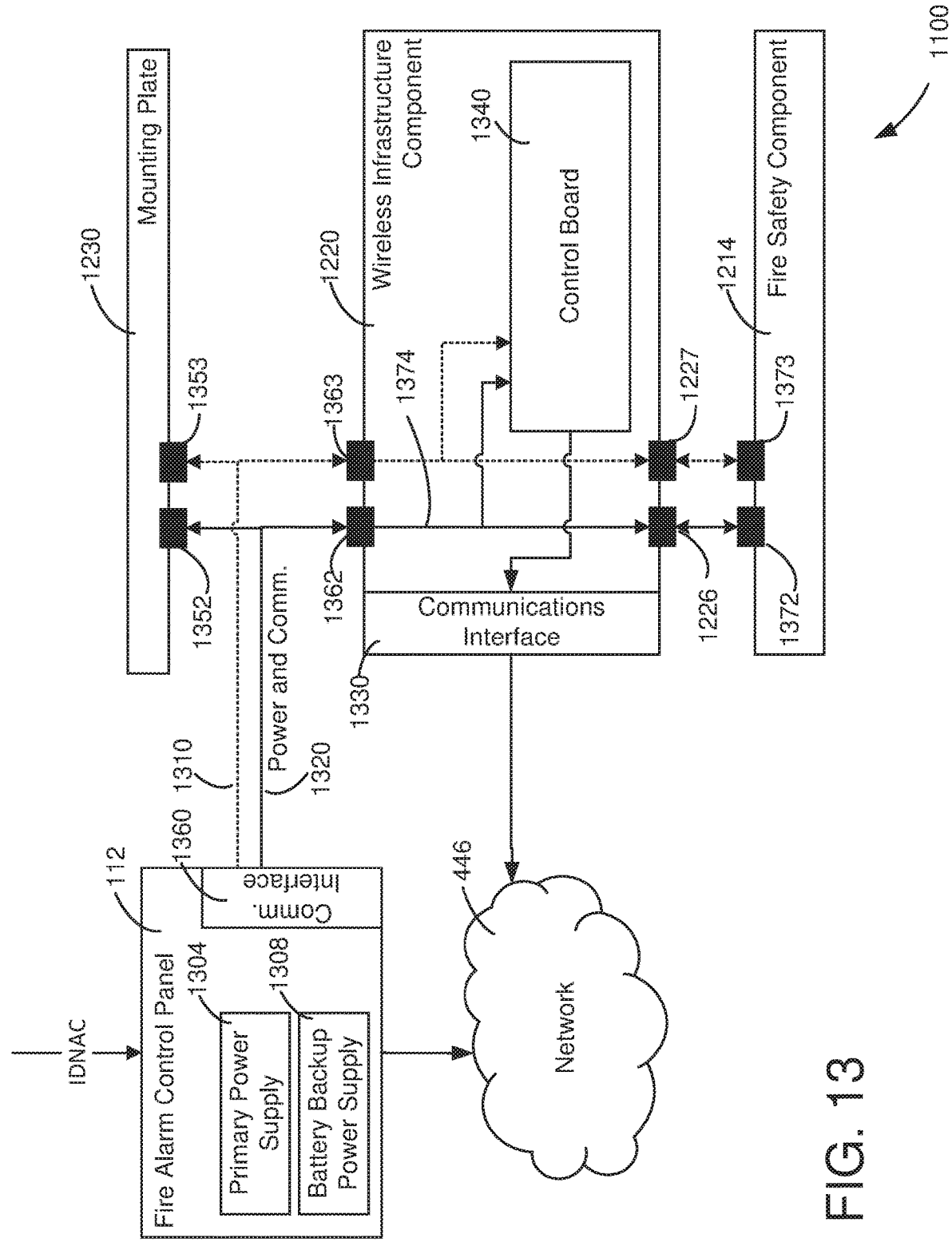
FIG. 13 is a block diagram illustrating a portion of the fire alarm system of FIG. 11 in greater detail, according to some embodiments.

Referring now to FIG. 13, a block diagram illustrating a portion of system 1100 in greater detail is shown, according to an exemplary embodiment. In FIG. 13 illustrates an exemplary manner in which fire safety component 1214, wireless infrastructure component 1220, and fire alarm control panel 112 can be connected. Fire alarm control panel 112 is shown to include primary power supply 1304 and battery backup power supply 1308. Primary power supply 1304 may be an AC power input from the wired interface of the building that lets fire alarm control panel 112 consume an electric utility of the building. In some embodiments, battery backup power supply 1308 comprises battery storage to provide fire system 100 with enough energy to power all the fire system devices within fire system 100 for a specified period of time (e.g., 48 hours of operation). Battery backup power supply 1308 may only be utilized by fire alarm control panel 112 when primary power supply 1304 fails (e.g., during a power outage).

Fire alarm control panel 112 connects to fire safety component 1214 and wireless infrastructure component 1220 through a power bus, such as Johnson Controls (JCI)/ Tyco Fire Panel Initiating Device Notification Appliance Circuit (IDNAC) bus, and a communications bus, in some exemplary embodiments. Wireless infrastructure component 1220 may be designed so that power and communications 1320 received at contact 1362 is input to control board 1340 and also passed directly through to contact 1226. Wireless infrastructure component 1220 may also be designed so that the power and communications input at contact 1363 is received at control board 1340 and is directly passed through to contact 1227 as well. Power and communications 1320 may be received by fire safety component 1214 at contact 1372 and contact 1373 (e.g., contact 1372 is the terminal connected to live wire from the electric utility of the building and the other contact 1373 is the terminal for ground). Communications from power and communications 1320 and power and communications 1310 may be received via power line communications as part of the signal from power.

In some embodiments, contact 1372 of fire safety component 1214 is identical in structure to contact 1362 of wireless infrastructure component 1220 and contact 1373 of fire safety component 1214 is identical in structure to contact 1363 of wireless infrastructure component 1220. For example, contact 1226 and contact 1227 may be metal prongs that secure into contact 1372 and contact 1373, which may be holes in fire safety component 1214, and contact 1362 and contact 1363 may both be holes in wireless infrastructure component 1220 as well. Additionally, contact 1362 and contact 1363 of wireless infrastructure component 1220 may couple to a mounting plate of a fire system device (e.g., mounting plate 1230). In some embodiments, contact 1352 and 1353 are both metal prongs identical in structure to contact 1226 and contact 1227 of wireless infrastructure component 1220. Thus, the metal prongs of mounting plate 1230 couple to wireless infrastructure component 1220 at contact 1362 and 1363 in the same way mounting plate 1230 ordinarily attaches to the rear surface of fire safety component 1214 if wireless infrastructure 1220 was not secured between mounting plate 1230 and fire safety component 1214, according to some embodiments.

In some embodiments, wired connection 1374 electrically couples contact 1362 and contact 1226, permitting power and communications data 1320 to reach fire safety component 1214 through wireless infrastructure component 1220. Furthermore, wired connection 1374 may also electrically couple to different parts of wireless infrastructure component 1220, such as control board 1340. For example, the "passing through" of data from power and communications 1320 and power and communications 1310 via electrical connections (e.g., wired connection 1374) allows power and communications data to be received by fire safety component 1214 without interference from wireless infrastructure component 1220. Wired connection 1374 may be similar or identical to other electrical connections within wireless infrastructure component 1220 (e.g., an electrical connection between contact 1363 and contact 1227).

Communications interface 1360 and communications interface 1330 can be or include wired or wireless communications interfaces (e.g., jacks, antennas, transmitters, receivers, transceivers, wire terminals, etc.) for conducting data communications with fire safety device 1402, BMS controller 366, and/or other devices within building 10. In various embodiments, communications via communications interface 1360 of fire alarm control panel 112 and via communications interface 1330 of wireless infrastructure component 1220 can be direct (e.g., local wired or wireless communications) or via a communications network 446 (e.g., a WAN, the Internet, a cellular network, etc.). For example, communications interface 1360 and communications interface 1330 can include an Ethernet card and port for sending and receiving data via an Ethernet-based communications link or network. In one embodiment, communications interface 1360 is a power line communications interface. In other embodiments, communications interface 1360 is an Ethernet interface.

Figure 14:
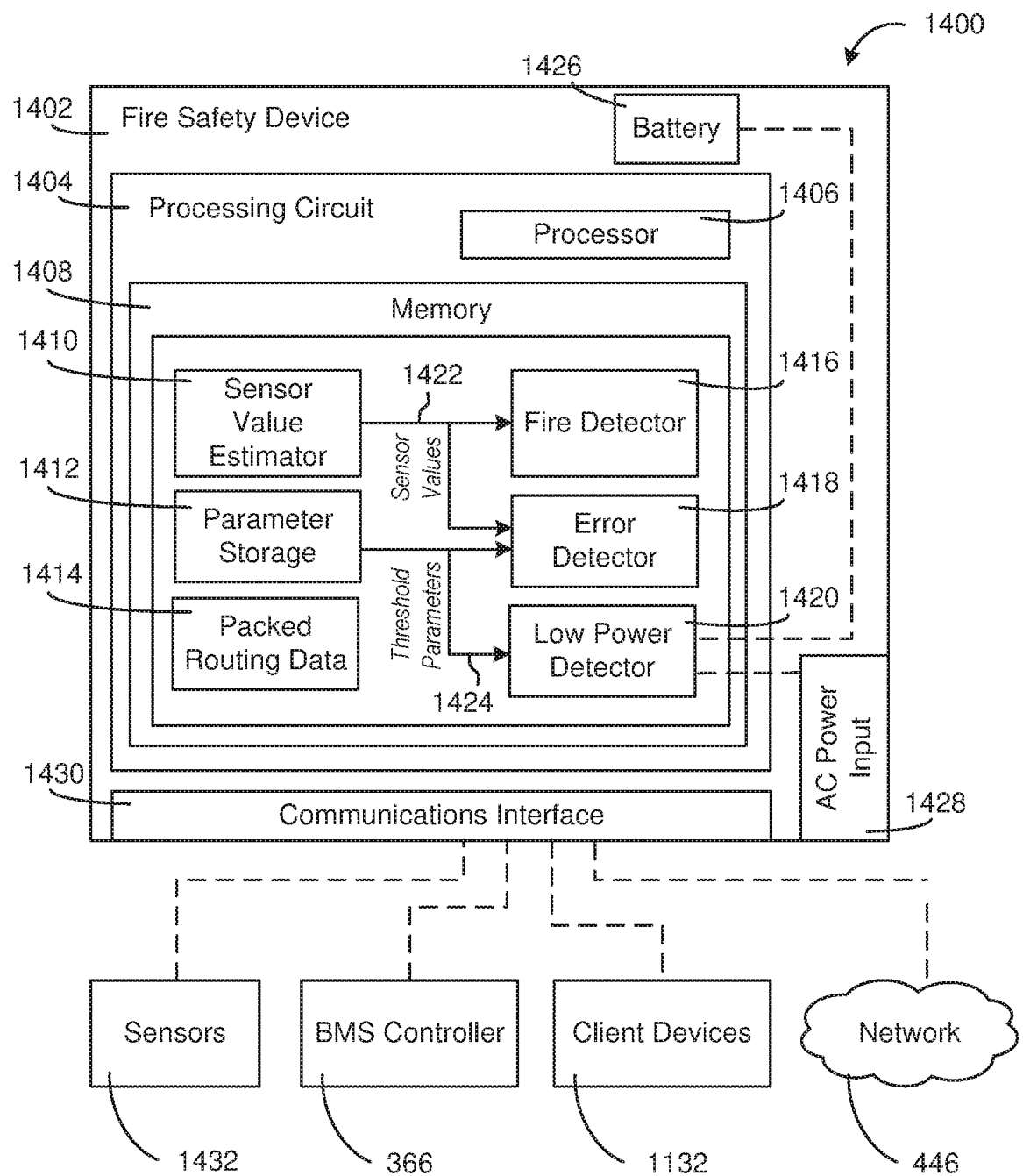
FIG. 14 is a block diagram of a fire safety device, which can be used in the fire system of FIG. 1, according to some embodiments.

Referring now to FIG. 14, block diagram of a system 1400 illustrating a fire safety device 1402 interacting with other building components is shown, according to an exemplary embodiment. Fire safety device 1402 can be used as a device in fire system 100 of FIG. 4 and can be implemented as one of various types of devices in fire system 100. For example, fire safety device 1402 may be any of a variety of addressable notification devices 114 (e.g., strobe light, sounding alarm, etc.). Fire safety device 1402 may also be any of a variety of addressable fire detection devices 118 (e.g., smoke detector, carbon monoxide detector, etc.). An additional type of fire safety device 1402 includes addressable manual notification devices (e.g., pull stations 119.). Each fire system device can be assigned an individual number, or address, that can be communicated to a fire alarm control panel (e.g., fire alarm control panel 112), which can be used to plot the exact location of the fire system device. Thus, when the device is activated to signal a fire alarm, the location of the activated fire alarm can be communicated to fire alarm control panel 112, as described in detail with reference to FIGS. 1-4. Fire safety device 1402 of the fire system 100 can be located within building 10 (e.g., as components of fire system 100). In some embodiments, fire safety device 1402 includes fire safety component 1214 and also has the same functions and applications of fire safety assembly 1112.

Fire safety device 1402 is shown to include a communications interface 1430. Communications interface 1430 can facilitate communications between the fire system controller 850 of FIG. 8 and external applications (e.g., monitoring and reporting applications, enterprise control applications, etc.) for allowing user control, monitoring, and adjustment to the fire system device. Communications interface 1430 can also enable communications between the fire system controller and client devices 1132 (e.g., routers, LAN, stationary terminal or a mobile device) and the communications network 446. Communications interface 1430 can facilitate communications between fire safety device 1402 and BMS controller 366 of the BMS for building 10. Furthermore, communications interface 1430 can transfer communications between a variety of sensors 1432 (e.g., temperature sensor, carbon monoxide sensor, light sensor, smoke sensor, etc.) and fire safety device 1402. In some embodiments, communications interface 1430 has the same applications and capabilities as communications interface 1360.

Still referring to FIG. 14, fire safety device 1402 is shown to include a processing circuit 1404 including processor 1406 and memory 1408. Processing circuit 1404 can be communicably connected to communications interface 1430 such that processing circuit 1404 and the various components thereof can send and receive data via communications interface 1430. Processor 1406 can be implemented as a general purpose processor, an application specific integrated circuit (ASIC), one or more field programmable gate arrays (FPGAs), a group of processing components, or other suitable electronic processing components.

Memory 1408 (e.g., memory, memory unit, storage device, etc.) can include one or more devices (e.g., RAM, ROM, Flash memory, hard disk storage, etc.) for storing data and/or computer code for completing or facilitating the various processes, layers, and modules described in the present application. Memory 1408 can include database components, object code components, script components, or any other type of information structure for supporting the various activities and information structures described in the present application. According to an exemplary embodiment, memory 1408 is communicably connected to processor 1406 via processing circuit 1404 and includes computer code for executing (e.g., by processing circuit 1404 and/or processor 1406) one or more processes described herein.

In some embodiments, memory 1408 includes a sensor value estimator 1410, parameter storage 1412, packed routing data 1414, fire detector 1416, error detector 1418, and low power detector 1420. These memory allocations can be configured to receive inputs from fire system 100 and/or other data sources and determine optimal control actions for fire system 100 based on the inputs. Additionally, memory 1408 can generate control signals based on the optimal control actions and provide the generated control signals to fire system controller 850. In other embodiments, memory 1408 includes additional memory components and/or excludes one or more memory components (e.g., sensor value estimator 1410, parameter storage 1412, etc.) displayed within memory 1408 in FIG. 14.

Sensor value estimator 1410 can be configured to receive input from a variety of sensors 1432 (e.g., temperature sensor, carbon monoxide sensor, smoke sensor), which may be integrated with fire safety device 1402 or separate from fire safety device 1402. Sensor value estimator 1410 may output the estimated sensor values 1422 to fire detector 1416 and error detector 1418. In some embodiments, sensor values 1422 contain values of current flowing between two electrically charged plates of sensors 1432 that can identify a fire when the current is interrupted, values of light filtering into sensors 1432, or values of electrical resistance in a circuit inside sensors 1432.

Still referring to FIG. 14, parameter storage 1412 can be configured to store threshold values for various parameters (e.g., the variables measured by sensors 1432). For example, smoke sensor values for detecting fires and the threshold value for low power can be stored in parameter storage 1412. Parameter storage 1412 may output threshold parameters 1424 to other components of fire safety device 1402 that use the data to perform a function, such as fire detector 1416, error detector 1418, and low power detector 1420.

Packed routing data 1414 can be configured to store the packets of data sent and received via communications network 446 or via an Ethernet-based communications link. For example, packed routing data 1414 may store packets of information that create a file containing an instruction for the fire safety device 1402 to trigger an audio alarm (e.g., horns, bells, voice evacuation system, etc.). Fire detector 1416 can be configured to activate and manage an action for fire safety device 1402 (e.g., turn on flashing beacons, turn on audio alarm notifications, etc.) when the sensor values indicate that a fire has started. The inputs fire detector 1416 receive can be sensor values 1422 from sensor value estimator 1410 or from communications with fire system controller 850 notifying all devices that a fire has started. Fire detector 1416 can output a notification that a fire has begun to the BMS controller 366 through fire system 100 via communications interface 1430.

Error detector 1418 can be configured to provide continuous error detection for fire safety device 1402, sensors 1432 (e.g., temperature sensors, smoke sensors, carbon monoxide sensors, motion sensors, etc.), battery 1426, or problems with communications. For example, the responses to detected faults can include providing an alert message to a user, a maintenance scheduling system, or a control algorithm configured to attempt to repair the error or to bypass the error. Error detector 1418 may also detect problems with different components of memory 1408, such as if parameter storage 1412 is missing data that low power detector 1420 may use as an input.

Still referring to FIG. 14, low power detector 1420 can be configured to activate a response (e.g., signaling a low battery light to turn on in the exterior of fire safety device 1402, turning on an audio signal that the fire system device needs a change in batteries, etc.) to low power to the fire system device. The low power to the fire system device can be a result of power failure, low battery in the fire system device, etc. A building (e.g., building 10) consumes an electric utility to provide electrical power in various areas of the building (e.g., lighting, HVAC, outlets, etc.). An AC power input 1428 can be a connection to the controller of the fire system device via a wired interface that allows the controller to consume electric utility. Battery 1426 can be located in the fire system device to provide backup power to the fire system device in the instance that AC power input 1428 from the building's electrical system fails (e.g., power outage due to damage to the electric transmission lines, short circuits, overloading of cables or transformers, etc.). In some embodiments, battery 1426 may be a rechargeable battery or a disposable lithium battery. Other embodiments may not have battery 1426 internal to fire safety device 1402. Other components of fire safety device 1402 (e.g. parameter storage 1412) and battery 1426 can send inputs to low power detector 1420. The inputs may be the amount of energy remaining in battery 1426, the amount of energy being received from AC power input 1428, and/or the threshold parameters for power from parameter storage 1412. Low power detector 1420 can also be configured to communicate with the fire control panel.

Figure 15:
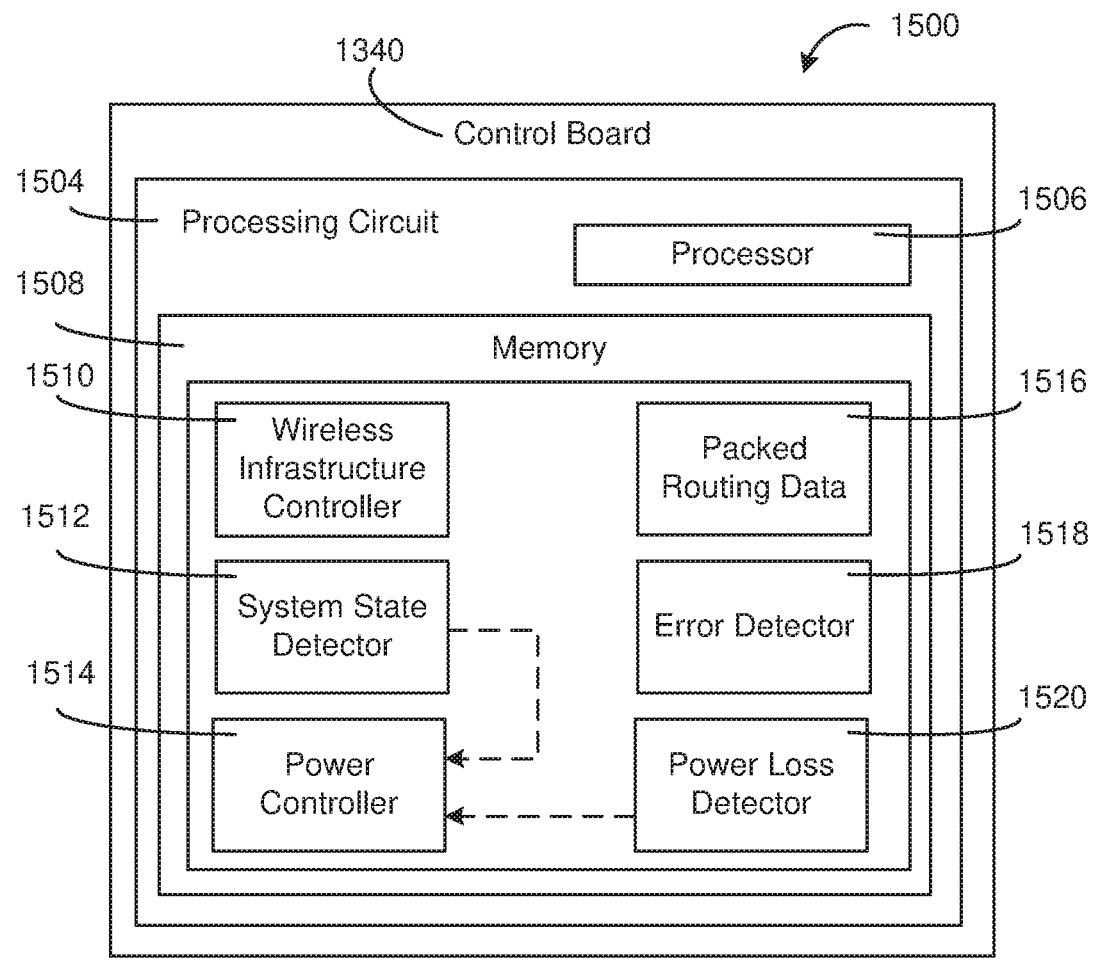
FIG. 15 is a block diagram of a control board for a wireless infrastructure component, according to some embodiments.

Referring now to FIG. 15, block diagram illustrating control board 1340 in greater detail is shown, according to an exemplary embodiment. Control board 1340 can be used in wireless infrastructure component 1220 of FIG. 12.

Control board 1340 is shown to include a processing circuit 1504 including processor 1506 and memory 1508. Processing circuit 1504 can be communicably connected to communications interface 1330 such that processing circuit 1504 and the various components thereof can send and receive data via communications interface 1330. Processor 1506 can be implemented as a general purpose processor, an application specific integrated circuit (ASIC), one or more field programmable gate arrays (FPGAs), a group of processing components, or other suitable electronic processing components Memory 1508 (e.g., memory, memory unit, storage device, etc.) can include one or more devices (e.g., RAM, ROM, Flash memory, hard disk storage, etc.) for storing data and/or computer code for completing or facilitating the various processes, layers, and modules described in the present application. Memory 1508 can include database components, object code components, script components, or any other type of information structure for supporting the various activities and information structures described in the present application. According to an exemplary embodiment, memory 1508 is communicably connected to processor 1506 via processing circuit 1504 and includes computer code for executing (e.g., by processing circuit 1504 and/or processor 1506) one or more processes described herein.

In some embodiments, memory 1508 includes wireless infrastructure controller 1510, system state detector 1512, power controller 1514, packed routing data 1516, error detector 1516, and power loss detector 1520. These memory allocations can be configured to receive data from fire system 100 and/or other input sources and decide the control actions for wireless infrastructure component 1220 based on the inputs. Additionally, memory 1508 can create control signals based on the optimal decision and provide the generated control signals to BMS controller 366 and/or fire system controller 850. In other embodiments, memory 1508 includes additional memory components and/or excludes one or more memory components (e.g., system state detector 1512, power loss detector 1520, etc.) displayed within memory 1508 in FIG. 15.

Still referring to FIG. 15, wireless infrastructure controller 1510 can be configured to carry out the functions needed by wireless infrastructure component 1220 in order to properly communicate to other devices within the wireless network of the building. For example, wireless infrastructure controller 1510 may make decisions on when to send signals to another wireless network device (e.g., a router, an access point, etc.). Additionally, wireless infrastructure controller 1510 may further process information received from other components within memory 1508, such as system state detector 1512 or power controller 1514, in order to then pass on the received information to other devices in the wireless network.

System state detector 1512 can be configured to receive, via the link between wireless infrastructure component 1220 and fire safety device 1402, information regarding the current status for fire system 100. For example, system state detector 1512 may determine that no AC power (e.g., AC power input 1428, described with reference to FIG. 14) is being received from fire alarm control panel 112 through power and communications 1320. In some embodiments, when system state detector 1512 identifies that fire system 100 is not being powered by AC power from fire alarm control panel 112, system state detector 1512 communicates this information to other components of memory 1508, such as wireless infrastructure controller 1510, power controller 1514, and power loss detector 1520. For example, the system state detector 1512 communicates a battery backup state or an alarm state of fire system 100 to notify other devices in fire system whether there is an active fire alarm or not in the building.

Power controller 1514 can be configured to change the power source for wireless infrastructure component 1220. In some instances, power controller may shut down wireless infrastructure 1220 when the services provided by the wireless infrastructure component are auxiliary and the backup battery supply is drained. For example, if power controller 1520 receives information from another component of memory 1508, such as power loss detector 1520 or system state detector 1512, that fire alarm control panel 112 is operating on backup battery mode, power controller 1520 may decide to power down wireless infrastructure component 1220. If it is found that there is an excess amount of energy stored in one or several backup batteries to satisfy fire safety regulations for powering fire system 100, power controller 1520 may continue to use fire alarm control panel 112 as a power source.

Packed routing data 1516 can be configured to store the packets of data sent and received via communications network 446 or via an Ethernet-based communications link. For example, packed routing data 1516 may store packets of data that generate a file with an instruction for the wireless infrastructure component 1220 to alert client devices within building 10 that the system status of the building is no AC power is being received from fire alarm control panel 112. Error detector 1518 can be configured to provide continuous error detection for wireless infrastructure component 1220, control board 1340, or problems with communications (e.g., problems with communications interface 1330). For example, error detector 1518 can respond to the detection of a complication by creating and sending a notification message to personnel within building 10, a maintenance scheduling system, or to a control algorithm that is programmed to correct the error or to circumvent the error. Error detector 1518 may further perceive complications with various components of memory 1508 (e.g., if power controller 1514 is not receiving input from power loss detector 1520 due to an interruption in the link between power controller 1514 and power loss detector 1520).

Power loss detector 1520 can be configured to send input to power controller 1514 indicating that the power received from fire safety device 1402 through contact 1226 and contact 1227, configured to couple wireless infrastructure component 1220 to fire safety device 1402, is below a standard level or does not exist. The power loss to the wireless infrastructure component 1220 can be due to a power failure in a building (e.g., building 10). For example, short circuits, overloading of cables and/or transformers, or a power outage caused by destruction to electric transmission lines can result in failure in the electrical system of a building.

Figure 16:
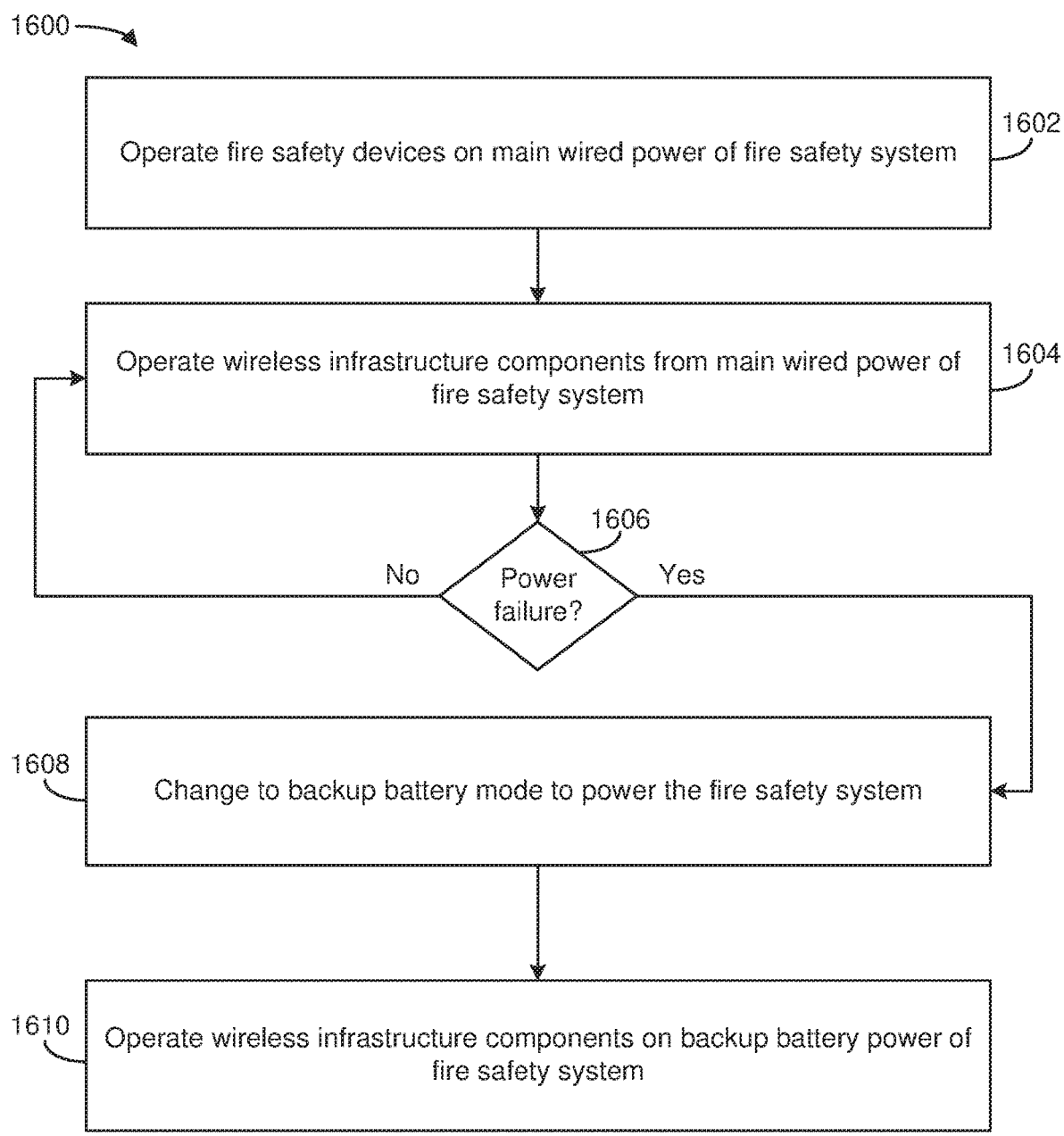
FIG. 16 is a flowchart of a process for powering the wireless network of a building with the power of the fire safety system, according to some embodiments

Referring now to FIG. 16, a flow diagram of an automated process 1600 for powering wireless infrastructure components is shown, according to some embodiments. Process 1600 can be executed in part by an application associated with BMS controller 366. Process 1600 provides an overview of an alternate way to power a wireless building network. The fire alarm system accomplishes this by powering wireless infrastructure components (e.g., the Wi-Fi mesh network, WiFi repeaters, gateways, etc.) associated with BMS controller 366. The process allows BMS controller 366 to automatically use the backup battery mode of the fire system to also power the wireless infrastructure components.

The use of the source for the power of the fire system as a source for the power of the wireless infrastructure allows the wireless infrastructure to continue operating in case of power outage (i.e., power failure, power blackout, etc.). For example, the backup battery power from the fire system can power the client's wireless devices if the electrical supply for a building were to fail during an earthquake due to damage of power transmission lines. By preventing the failure of the wireless network, this disclosure also may provide a way for the numerous business transactions and communications that occur during the work day to continue. Furthermore, installation of wireless communication infrastructure in a building (e.g., building 10) is a costly endeavor, especially once building construction has been completed. Taking advantage of the fire alarm system to power the wireless infrastructure components can save customers the expensive undertaking of installing a wireless communication infrastructure.

Traditional wireless infrastructure, such as Wi-Fi, also may have areas where the coverage is unreliable or insufficient for use by building systems (e.g., lighting, HVAC, security, etc.). Since fire alarm devices are required by law in locations throughout a building (e.g., building 10), using the fire alarm system to power wireless infrastructure components may increase coverage and reliability of the wireless building network. However, the capability of powering wireless infrastructure components to the fire alarm system is a supplemental function of the fire alarm system, such that any failure of a wireless infrastructure component cannot influence the operation of the fire system.

Process 1600 is shown to include operating fire system devices on the main wired power of the fire system (step 1602). In some embodiments, the main wired power of the fire system is an AC power input (e.g., AC power input 1428) from the electric utility of the building. The electric utility of the building may be provided by energy supply from a power plant that uses various resources (e.g., nuclear, solar, wind, water, fossil fuels, etc.) to generate energy transferred to the building by transmission lines. AC power input may provide electrical power to components of the fire system (e.g., fire alarm control panel 1106, fire system device 1112, fire system device 1114, fire system device 1116, etc.) through a connection made via the wired interface of the building (e.g., building 10).

Process 1600 is shown to include operating wireless infrastructure components from the main wired power of the fire system (step 1604). The wireless infrastructure components, such as a Wi-Fi mesh network, may consume electric utility through a connection made via the wired interface of the building between the wireless infrastructure components and the components of the fire system (e.g., fire alarm control panel 1106, fire system device 1112, etc.). For example, the AC power input (e.g., AC power input 1428) from the electric utility of the building, which can power the fire system, can be configured to power the wireless infrastructure components.

Process 1600 is shown to include determining whether a power failure has occurred (step 1606). In some embodiments, step 1606 is performed by low power detector 1420, as described with reference to FIG. 14. If low power detector 1420 determines in step 1606 that a power failure (e.g., power outage due to damage to the electric transmission lines, short circuits, overloading of cables or transformers, etc.) has not occurred, process 1600 is shown to proceed with powering the wireless infrastructure components with the main wired power of the fire system (step 1604). For example, if a power failure has not been detected by low power detector 1420, the wireless infrastructure components that create the wireless building network can continue to operate from the AC power input from the electric utility of the building.

If low power detector 1420 determines in step 1606 that a power failure has occurred, process 1600 is shown to proceed with changing the power of the fire system to operate on one or more backup batteries inside fire system devices, as shown in FIG. 14 (step 1608). The one or more backup batteries inside a fire system device may be disposable lithium batteries and/or rechargeable batteries. In some embodiments, when the fire system device uses the batteries of the device for power, the fire system device turns on a notification signal (e.g., a flashing light, a red warning light, etc.) that the device is using the alternative power of the batteries. This can be used to indicate to those checking the device for maintenance, or to others in the building, that the backup battery power of the device is being used instead of the main wired power (e.g., AC power input 1428).

Process 1600 is shown to include operating wireless infrastructure components on the backup battery power of the fire system (step 1610). For example, if a severe storm caused a power outage, the fire system (e.g., fire system 100) is powered by disposable and/or rechargeable batteries in the devices. The fire system powers the wireless infrastructure components (e.g., Wi-Fi mesh network), allowing the wireless infrastructure components to also draw electric utility from the batteries of the fire system. Thus, the wireless building network can continue to operate during a power failure by drawing power from the fire system. In some embodiments, when the fire system is running off of the backup power of the batteries, the auxiliary wireless devices being powered by the fire system power disconnect. Disconnecting the auxiliary wireless infrastructure components may occur to ensure that the battery power can supply the fire system with enough power for a required period of time (e.g., a regulated safety requirement for a specific duration). While the power supply to the fire system meets the power requirements for the specific period of time, battery power in excess of that requirement can be used to power the wireless infrastructure system.

Figure 17:
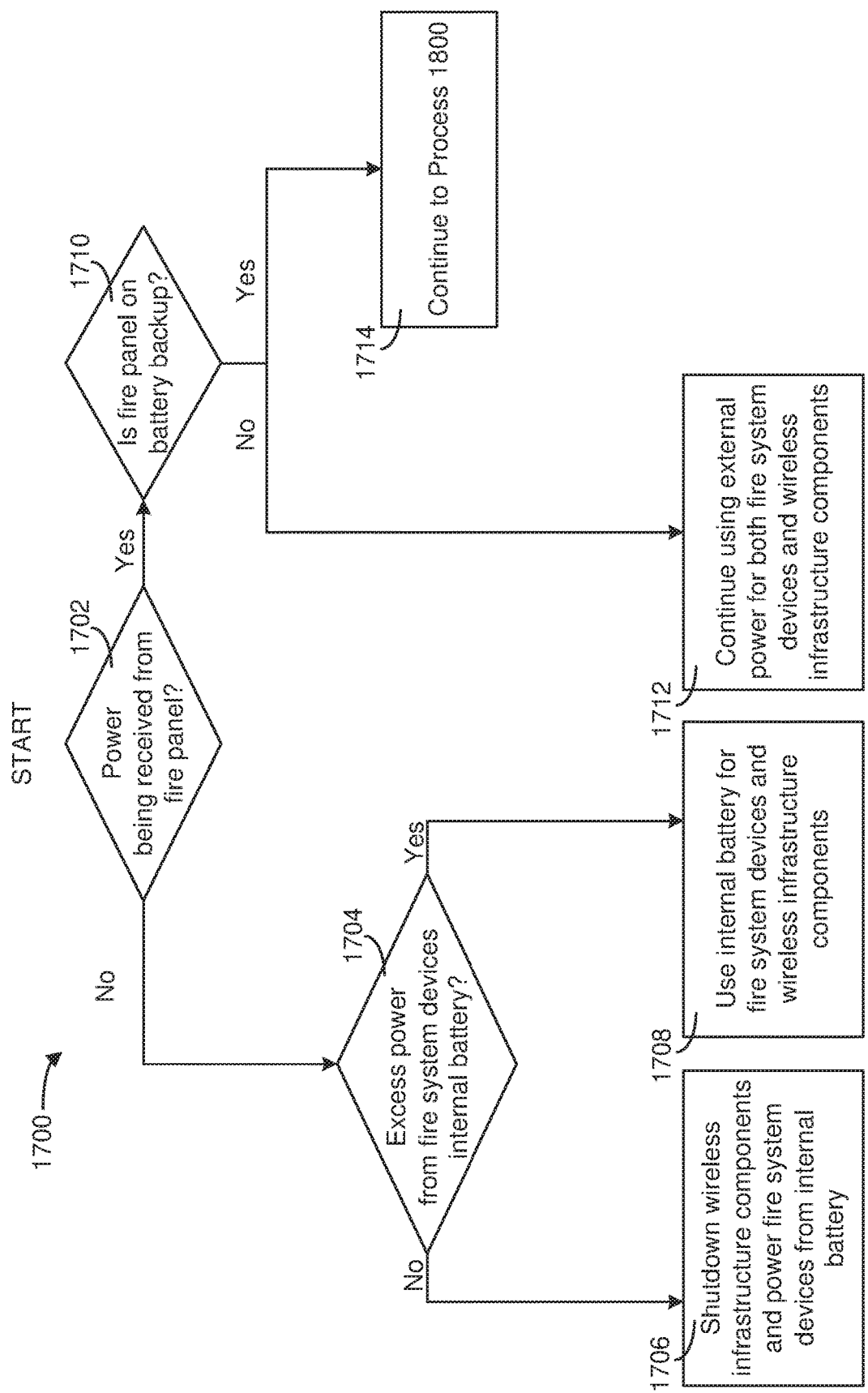
FIG. 17 is a flowchart of a process for the decision making of how to power the fire system devices and wireless infrastructure components, according to some embodiments.

Referring now to FIG. 17, a flow diagram for an automated process for deciding how to power the fire system devices and wireless infrastructure components is shown, according to some embodiments. Process 1700 can be executed in part by an application associated with fire system 100 and/or BMS controller 366. Process 1700 demonstrates another embodiment of how to power a wireless network of a building (e.g., building 10) and the results of different scenarios that may occur within the fire system. By permitting wireless infrastructure components to siphon power from the backup battery of fire system devices, the wireless network of a building may be maintained during times of power outage (i.e., power blackout, power failure, etc.).

Process 1700 is shown to include determining if there is power being received from the fire panel (step 1702). For example, this step may be executed by low power detector 1420, described with reference to FIG. 14, or power loss detector 1520, described with reference to FIG. 15. In some embodiments, low power detector 1420 determines whether there is a loss of power and communications 1320 from fire alarm control panel 112 caused by a power failure (i.e., power outage due to short circuits, damage to electric transmission lines, fire, etc.). If it is detected that there is no power being supplied from the fire panel, process 1700 is shown to include deciding if there is excess power from the internal battery of the fire system device (step 1704). In some embodiments, the decision is made by low power detector 1420 using information from battery 1426 and parameter storage 1412. Fire safety systems are required by code to have enough backup power to continue running fire safety devices (e.g., fire safety device 1402). Therefore, in an exemplary embodiment, the decision is determined by low power detector 1420 on whether battery 1426 has a surplus of charge to exceed the safety requirements mandated by code for fire system 100.

If it is detected in step 1704 that there is not excess power from the battery, process 1700 is shown to include shutting down wireless infrastructure components and powering the fire system devices from the battery backup power that is stored in the battery of the fire system devices (step 1706). In some embodiments, during this step, wireless infrastructure component 1220 receives input from fire safety device 1402 on the system state of fire system 100 and battery 1426 of fire safety device 1402 through power and communications 1310. For example, this step may be executed by power controller 1514, as described with reference to FIG. 15, after receiving communications from the fire safety device that there is not enough charge in the battery 1426 of fire safety device 1402 to power both the fire safety device 1402 and wireless infrastructure component 1220 to meet safety code requirements. In other embodiments, wireless infrastructure component 1220 also contains a backup battery, such as a disposable lithium battery or a rechargeable battery, to use when a power failure occurs and no excess power exists in the backup battery of fire safety device 1402.

If it is detected in step 1704 that there is excess power from the internal battery of the fire system device, process 1700 is shown to include using internal batteries of the fire system device for both powering fire system devices and wireless infrastructure components (step 1708). In some embodiments, this is executed by low power detector 1420 finding battery 1426 has a surplus amount of charge to meet safety requirement standards for power to fire system 100 and also supply power to wireless infrastructure component 1220. For example, low power detector 1420 may find that internal battery 1426 can power a wireless infrastructure component for 48 hours in addition to powering fire safety device 1402, supplying power to both for the same amount of time.

Still referring to FIG. 17, if in step 1702 it is determined that there is power from the fire panel, process 1700 is shown to include determining if the fire panel is in battery backup mode (step 1710). In some embodiments, this step is executed by low power detector 1420 and communications interface 1430. For example, low power detector 1420 may find that there is power being received at AC power input 1428 from power and communications 1320 of fire alarm control panel 112. In addition, communications interface 1430 may receive input by power and communications 1310 from fire alarm control panel 112 about the system state of the fire panel and whether or not primary power supply 1304 is being utilized and/or battery backup power supply 1308 is being utilized as the source for power. In other embodiments, network 446 may relay the input that fire alarm control panel 112 is operating on backup battery mode through communications interface 1430.

Process 1700 is shown to include continuing to use external power for both fire system devices and wireless infrastructure components if it is determined in step 1710 that the fire panel is not in battery backup mode for power (step 1712). For example, if low power detector 1420 and communications interface 1430 observe that fire alarm control panel 112 is being powered by IDNAC and the electric utility of the building (e.g., building 10), fire safety device 1402 and wireless infrastructure component 1220 may continue to be powered by the main power input of the building. If it is determined that the fire panel is in battery backup mode in step 1710, process 1700 is shown to include continuing to process 1800 (step 1714). In some embodiments, power and communications 1310 may send the information to communications interface 1430 that fire alarm control panel 112 is relying on battery backup power supply 1308 to power the fire system of the building (e.g., fire system 100).

Referring now to FIG. 18, a flow diagram for an automated process, which continues from the decision step 1710 of process 1700, for determining how to power the fire system devices of a fire system and wireless infrastructure components is shown, according to an exemplary embodiment. After it is decided that yes, the fire panel is in battery backup mode in step 1710, process 1800 begins with deciding if there is excess power from the backup battery of the fire panel (step 1802). Step 1802 may be decided similarly to how step 1704 of process 1700 is decided, however, the backup battery power is from the fire panel in step 1802 instead of an internal battery within a fire system device as in step 1704. In some embodiments, the decision is made by low power detector 1420 using information from battery 1426 and parameter storage 1412. In other embodiments, the decision of step 1802 is determined by a fire system controller (e.g., fire system controller 850). The fire system may be required to have a specific amount of reserved backup power in the budgeting of power to operate fire system devices due to safety regulations for the building. If it is determined in step 1802 that there is a surplus of energy stored in the backup battery of the fire panel, process 1800 continues to step 1814 and uses the power from the fire panel battery backup to continue to power both the fire system devices and the wireless infrastructure components.

In other embodiments, even if it is determined in step 1802 that there is an excess amount of energy stored in the backup battery of the fire panel to use for power, the fire system devices (e.g., fire safety component 1402) and the wireless infrastructure devices (e.g., wireless infrastructure component 1220) are powered from an internal battery of the fire system device instead of the excess backup battery power from the fire panel in step 1814. This may allow the fire panel to reserve the excess power from the backup battery to budget more power for the fire system (e.g., fire system 100) for an extended amount of time. In some embodiments, when there is excess power from the backup battery of the fire panel, the fire system devices and the wireless infrastructure components only operate on the excess power if the amount of energy stored in the internal battery of the fire system device is depleted.

Otherwise, if it is determined that there is not excess power from fire panel battery backup, process 1800 proceeds to determining if there is an internal battery in the fire system device (step 1804). In some embodiments, the fire system devices do not have an internal battery, and therefore process 1800 is shown to shut down the wireless infrastructure components (step 1808). The wireless infrastructure components that are shut down may provide auxiliary functions to the building, and when the building may be in an active alarm state (e.g., during a fire or power outage), the focus of the building manage system may be to operate as many fire system devices within a fire system to promote safety of the building occupants. Step 1808 may occur in process 1800 similar to how step 1706 of process 1700 is, in part, executed. For example, this step may be carried out in process 1800 by power controller 1514 when communications are received from the fire safety device (e.g., fire safety device 1402) that there is not a surplus of energy stored in the backup battery of the fire panel to operate enough fire system devices and operate the wireless infrastructure component 1220.

However, if in step 1804 it is determined that the fire system device does have an internal battery, process 1800 is shown to proceed to determining if there is excess power from the internal battery of the fire system device (step 1806). In some embodiments, step 1806 is carried out in a similar or identical fashion to how step 1704 of process 1700 is executed. In some embodiments, low power detector 1420 makes the decision using information from battery 1426 and parameter storage 1412. Fire safety systems may be required by code to have enough backup power to continue running fire safety devices (e.g., fire safety device 1402) for a specific amount of time. Thus, in an exemplary embodiment, the decision is determined by low power detector 1420 on whether battery 1426 has an excess amount of energy to meet and surpass the safety requirements required by code for a fire system of a building (e.g., building 10).

If it is detected in step 1806 that there is not excess power that can be used from the battery of the fire system device, process 1800 continues to step 1810 and shuts down wireless infrastructure components and powers the fire system devices from the power of the internal battery within the fire system device (step 1810). In some embodiments, during this step, wireless infrastructure component 1220 receives input from fire safety device 1402 on the state of fire system 100 and battery 1426 of fire safety device 1402 through power and communications 1310. For example, this step may be executed by power controller 1514 after receiving communications from the fire safety device that there is not enough charge in the battery 1426 of fire safety device 1402 to power both the fire safety device 1402 and wireless infrastructure component 1220 during an alarm state.

However, if it is decided in step 1806 that there is excess power that can be siphoned from the internal battery of the fire safety device, process 1800 is shown to include using the internal battery for both the fire system device and wireless infrastructure component (step 1812). In some embodiments, step 1812 is carried out by process 1800 in a similar manner or fashion as step 1708 is carried out by process 1700, as described with reference to FIG. 17. In some embodiments, this step is executed by low power detector 1420 determining that battery 1426 has an excess amount of energy remaining to satisfy safety requirements for power to fire system 100 and also supply power to wireless infrastructure component 1220. For example, low power detector 1420 may find that the internal battery of fire safety 1402, battery 1426, is able to power a wireless infrastructure component for 24 hours in addition to powering fire safety device 1402, supplying power to both for the same amount of time.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A wireless infrastructure component for integration with a building fire system, the wireless infrastructure component comprising:
    a first mounting interface configured to physically couple to a mounting surface and comprising a first power connector configured to receive power from the building fire system;
    a second mounting interface configured to physically couple to a fire system component and comprising a second power connector configured to provide power to the fire system component and
    a wireless communications interface electrically coupled between the first power connector and the second power connector and configured to use the power from the building fire system to conduct wireless communications with one or more wireless devices.

2. The wireless infrastructure component of claim 1, wherein the fire system component is a fire notification device or a fire detection device of the building fire system.

3. The wireless infrastructure component of claim 1, wherein:
    the fire system component comprises a third mounting interface configured to physically couple to the mounting surface; and
    the first mounting interface of the wireless infrastructure component is configured to emulate the third mounting interface to enable the wireless infrastructure component to be physically coupled to the mounting surface.

4. The wireless infrastructure component of claim 3, wherein
    the mounting surface comprises a fourth mounting interface configured to physically couple to the third mounting interface of the fire system component; and
    the second mounting interface of the wireless infrastructure component is configured to emulate the fourth mounting interface to enable the wireless infrastructure component to be physically coupled to the third mounting interface of the fire system component.

5. The wireless infrastructure component of claim 1, wherein the mounting surface is part of the fire system component.

6. The wireless infrastructure component of claim 1, wherein the wireless infrastructure component comprises a control board configured to:
    electrically couple the wireless communications interface to the first power connector;
    determine a state of the building fire system; and
    selectively provide the power from the building fire system to the wireless communications interface based on the state of the building fire system.

7. The wireless infrastructure component of claim 6, wherein the state of the building fire system is a battery backup state and wherein the control board is configured to:
    determine that the power from the building fire system is being received and that the power is not from a backup battery of the building fire system; and
    operate the wireless infrastructure component and the fire system component on the power from the building fire system in response to determining that the power from the building fire system is not from the backup battery.

8. The wireless infrastructure component of claim 1, wherein the wireless infrastructure component comprises at least one of a wireless mesh node, a wireless repeater, a wireless occupancy sensor, or a wireless HVAC sensor that receives and sends signals via wireless network.

9. The wireless infrastructure component of claim 1, wherein the power from the building fire system is a wired input from a fire panel Initiating Device Notification Appliance Circuit (IDNAC) bus.

10. A building fire system comprising:
    a fire system component configured to operate on power from the building fire system;
    a wireless infrastructure component configured to:
        physically couple to a mounting surface via a first mounting interface, the first mounting interface comprising a first power connector configured to receive power from the building fire system;
        physically couple to the fire system component via a second mounting interface, the second mounting interface comprising a second power connector configured to provide power to the fire system component; and
        conduct wireless communications with one or more wireless devices using the power from the building fire system via a wireless communications interface electrically coupled between the first power connector and the second power connector.

11. The building fire system of claim 10, the wireless infrastructure component further configured to:
    detect a loss of power from the building fire system;
    determine whether an amount of energy in a backup battery of the fire system component is sufficient to power both the fire system component and the wireless infrastructure component; and
    shut down the wireless infrastructure component in response to determining that the amount of energy in the backup battery is insufficient to power both the fire system component and the wireless infrastructure component.

12. The building fire system of claim 10, wherein the wireless infrastructure component comprises:
    the first mounting interface configured to physically couple to the mounting surface and comprising the first power connector configured to receive the power from the building fire system; and
    the second mounting interface configured to physically couple to the fire system component and comprising the second power connector configured to provide the power to the fire system component.

13. The building fire system of claim 12, wherein:
    the fire system component comprises a third mounting interface configured to physically couple to the mounting surface; and
    the first mounting interface of the wireless infrastructure component is configured to emulate the third mounting interface to enable the wireless infrastructure component to be physically coupled to the mounting surface.

14. The building fire system of claim 10, wherein the fire system component comprises: a rear face configured to receive the power from the building fire system; and a front face configured to physically couple to the wireless infrastructure component and provide the power from the building fire system to the wireless infrastructure component.

15. A method for powering a wireless infrastructure component using power from a building fire system, the method comprising:
    operating a fire system component on the power from the building fire system;
    physically coupling the wireless infrastructure component to a mounting surface via a first mounting interface comprising a first power connector configured to receive power from the building fire system;

physically coupling the wireless infrastructure component to the fire system component via a second mounting interface comprising a second power connector configured to provide power to the fire system component; and conducting wireless communications with one or more wireless devices using the power from the building fire system via a wireless communications interface electrically coupled between the first power connector and the second power connector.

16. The method of claim 15, the method further comprising:

detecting a loss of the power from the building fire system;

determining whether an amount of energy in a backup battery is sufficient to power both the fire system component and the wireless infrastructure component; and shutting down the wireless infrastructure component in response to determining that the amount of energy in the backup battery is insufficient to power both the fire system component and the wireless infrastructure component.

17. The method of claim 15, wherein the wireless infrastructure component comprises at least one of a wireless mesh node, a wireless repeater, a wireless occupancy sensor, or a wireless HVAC sensor that receive and send signals via wireless network.

18. The method of claim 15, wherein the fire system component is a fire suppression device, a fire notification device in a fire notification loop, or a fire detection device in a fire detection loop of the building fire system.

19. The method of claim 18, wherein a wired connection of the wireless infrastructure component to the fire notification loop or the fire detection loop is an auxiliary connection.

* * * * *